(12) United States Patent
Huang et al.

(10) Patent No.: US 11,212,652 B2
(45) Date of Patent: Dec. 28, 2021

(54) POSITIONING METHOD AND APPARATUS

(71) Applicant: Honor Device Co., Ltd., Guangdong (CN)

(72) Inventors: Qing Huang, Beijing (CN); Zeling Qiu, Beijing (CN)

(73) Assignee: HONOR DEVICE CO., LTD., Shenzhen (CN)

(*) Notice: Subject to any disclaimer, the term of this patent is extended or adjusted under 35 U.S.C. 154(b) by 11 days.

(21) Appl. No.: 16/640,851

(22) PCT Filed: Aug. 23, 2017

(86) PCT No.: PCT/CN2017/098675
§ 371 (c)(1),
(2) Date: Feb. 21, 2020

(87) PCT Pub. No.: WO2019/036939
PCT Pub. Date: Feb. 28, 2019

(65) Prior Publication Data
US 2020/0382919 A1 Dec. 3, 2020

(51) Int. Cl.
*H04W 4/33* (2018.01)
*G01S 5/02* (2010.01)
*G01S 19/48* (2010.01)
*H04W 4/02* (2018.01)

(52) U.S. Cl.
CPC .......... *H04W 4/33* (2018.02); *G01S 5/02521* (2020.05); *G01S 19/48* (2013.01); *H04W 4/02* (2013.01)

(58) Field of Classification Search
CPC ....... H04W 4/02; H04W 4/33; G01S 5/02521; G01S 19/48
See application file for complete search history.

(56) References Cited

U.S. PATENT DOCUMENTS

2009/0318151 A1   12/2009   Jung et al.
2014/0114568 A1   4/2014    Park
2015/0024772 A1   1/2015    Das et al.
(Continued)

FOREIGN PATENT DOCUMENTS

CN   101938831 A   1/2011
CN   102645666 A   8/2012
(Continued)

OTHER PUBLICATIONS

Li, J., et al., "Information Technology and Communication Navigation System," Aug. 31, 2014, 14 pages.
(Continued)

*Primary Examiner* — Wayne H Cai
(74) *Attorney, Agent, or Firm* — Conley Rose, P.C.

(57) ABSTRACT

A positioning method and apparatus include obtaining, by a terminal, an outdoor positioning result using an outdoor positioning service, attempting, by the terminal when information about a satellite that provides the outdoor positioning service meets a preset condition, to obtain an indoor positioning result using an indoor positioning service, where the preset condition indicates that the terminal has an indoor positioning requirement, and switching, by the terminal, from the outdoor positioning service to the indoor positioning service when the indoor positioning result is successfully obtained.

20 Claims, 16 Drawing Sheets

(56) References Cited

U.S. PATENT DOCUMENTS

| | | | |
|---|---|---|---|
| 2015/0097731 A1* | 4/2015 | Russell | G01S 19/48 |
| | | | 342/450 |
| 2015/0141045 A1* | 5/2015 | Qiu | H04W 4/021 |
| | | | 455/456.1 |
| 2016/0080911 A1 | 3/2016 | Kay et al. | |
| 2016/0337888 A1* | 11/2016 | Zhang | G06T 17/05 |
| 2016/0366552 A1 | 12/2016 | Huang | |
| 2017/0234980 A1 | 8/2017 | Zhang | |
| 2017/0249714 A1* | 8/2017 | Van Hoof | G06Q 90/20 |
| 2020/0326801 A1* | 10/2020 | Nixon | H04L 67/18 |

FOREIGN PATENT DOCUMENTS

| | | |
|---|---|---|
| CN | 102721972 A | 10/2012 |
| CN | 102883393 A | 1/2013 |
| CN | 103454661 A | 12/2013 |
| CN | 103856989 A | 6/2014 |
| CN | 104678420 A | 6/2015 |
| CN | 105022077 A | 11/2015 |
| CN | 105163373 A | 12/2015 |
| CN | 106255054 A | 12/2016 |
| CN | 106993319 A | 7/2017 |
| CN | 107084729 A | 8/2017 |
| WO | 2016019504 A1 | 2/2016 |

OTHER PUBLICATIONS

Wang, X., et al., "Latest Progress and Application of Pseudolite Positioning Technology," GNSS World Special Technology, Apr. 2013, 9 pages with 4 pages English translation.

\* cited by examiner

POSITIONING METHOD AND APPARATUS

CROSS-REFERENCE TO RELATED APPLICATIONS

This application is a U.S. National Stage of International Patent Application No. PCT/CN2017/098675 filed on Aug. 23, 2017, which is hereby incorporated by reference in its entirety.

TECHNICAL FIELD

Embodiments of this application relate to the field of communications technologies, and in particular, to a positioning method and an apparatus.

BACKGROUND

A positioning service of a mobile terminal such as a mobile phone is a service for obtaining location information of the terminal by using a specific positioning technology and further marking a location of the located terminal on an electronic map.

Generally, during outdoor positioning, high-precision outdoor positioning may be implemented based on a global positioning system (Global Positioning System, GPS) or a base station provided by a mobile network operator. However, precision is relatively low when this positioning method is applied to indoor positioning. Therefore, during indoor positioning, indoor positioning may be performed based on a wireless fidelity (Wireless-Fidelity, Wi-Fi) signal or a Bluetooth (Bluetooth, BT) signal with better signal quality.

However, because the terminal is characterized by real-time mobility, when a user carries the terminal from an outdoor area to an indoor area or from an indoor area to an outdoor area, precision and a speed are significantly reduced when the terminal uses the foregoing method to perform positioning.

For example, the terminal performs positioning in the outdoor area by using a GPS signal. When the user carries the terminal from the outdoor area to the indoor area, the GPS signal gradually attenuates, and the terminal is triggered to reselect another positioning method only when the terminal cannot detect the GPS signal or strength of the GPS signal is very low. For example, a Wi-Fi module is enabled to perform positioning based on a detected Wi-Fi signal. This switching process is usually quite time-consuming, and the terminal cannot provide a relatively accurate positioning result for the user in the switching process.

SUMMARY

Embodiments of this application provide a positioning method and an apparatus, so that a terminal can provide a positioning service in a relatively accurate and quick manner when performing switching between an indoor area and an outdoor area.

To achieve the foregoing objective, the following technical solutions are used in the embodiments of this application:

According to a first aspect, an embodiment of this application provides a positioning method, including: obtaining, by a terminal, an outdoor positioning result by using an outdoor positioning service; attempting, by the terminal when information about a satellite that provides the outdoor positioning service meets a preset condition, to obtain an indoor positioning result by using an indoor positioning service, where the preset condition is used to indicate that the terminal has an indoor positioning requirement; and if the indoor positioning result is successfully obtained, switching, by the terminal, the outdoor positioning service to the indoor positioning service.

In other words, when performing positioning, the terminal does not passively wait for a currently used positioning service to fail before the terminal is triggered to use a new positioning service for positioning. Instead, the terminal actively detects a current positioning scenario in a positioning process, and then selects a positioning method with relatively high precision in the current positioning scenario to locate the terminal, thereby ensuring positioning precision, reducing a time consumed by switching a positioning service between an indoor area and an outdoor area, and improving user's use experience.

In a possible design method, the satellite information includes a quantity X (X≥0) of target satellites that provide a positioning service, and the target satellite is a satellite that is in all satellites that provide a positioning service for the terminal and that sends a satellite signal with a signal-to-noise ratio greater than a preset value. In this case, the satellite can provide an effective positioning service for the terminal. In addition, quantities of satellites that can provide an effective positioning service are different in different positioning scenarios. Therefore, the preset condition may be set as: X≤M or X≥N, and 0<M<N. That is, when the quantity of target satellites is relatively large or is relatively small, a current positioning scenario may be considered as an indoor positioning scenario.

In a possible design method, the attempting, by the terminal when information about a satellite that provides the outdoor positioning service meets a preset condition, to obtain an indoor positioning result by using an indoor positioning service includes: when X≤M or X≥N, determining, by the terminal, a distance between the terminal and a candidate building in a target area, where the target area is a preset area to which the outdoor positioning result belongs; using, by the terminal, a candidate building whose distance from the terminal is less than a preset value as a target building; and enabling, by the terminal, the indoor positioning service to attempt to obtain an indoor positioning result of the terminal in the target building.

In this case, the terminal may identify, based on a quantity of target satellites detected in real time, a requirement of the terminal for performing the indoor positioning service, and when the terminal has an indoor positioning service requirement, the terminal is triggered to determine, based on the outdoor positioning result, a specific target building for performing indoor positioning, and attempt to perform indoor positioning on the terminal in the target building, thereby quickly and accurately implementing seamless switching between the indoor positioning service and the outdoor positioning service, and improving user's use experience.

In a possible design method, when the indoor positioning result is successfully obtained, the method further includes: stopping, by the terminal, providing the outdoor positioning service, thereby reducing power consumption when the terminal provides a positioning function.

In a possible design method, after the switching, by the terminal, the outdoor positioning service to the indoor positioning service, the method further includes: when the terminal fails to obtain the indoor positioning result of the terminal Y (Y≥1) consecutive times, switching, by the terminal, the indoor positioning service to the outdoor positioning service. That is, when moving from an indoor area to an outdoor area, the terminal may actively detect a current positioning scenario in a positioning process, and then select a positioning method with relatively high precision in the current positioning scenario to locate the terminal, thereby ensuring positioning precision and reducing a time for switching a positioning service from an indoor area to an outdoor area by the terminal.

In a possible design method, after the attempting, by the terminal, to obtain an indoor positioning result by using an indoor positioning service, the method further includes: if the indoor positioning result is not obtained, continuing, by the terminal, to obtain the outdoor positioning result by using the outdoor positioning service.

In a possible design method, the method further includes: determining, by the terminal, a distance between the terminal and a target location, where the target location is a destination to which the terminal moves in a current positioning period; and adjusting, by the terminal, a length of the positioning period based on the distance between the terminal and the target location.

For example, when the distance between the terminal and the target location is longer, a value of the positioning period is larger, thereby reducing power consumption of the terminal; or when the distance between the terminal and the target location is shorter, a value of the positioning period is smaller, thereby ensuring that a user can obtain a relatively accurate positioning result in real time.

In a possible design method, before the determining, by the terminal, a distance between the terminal and a target location, the method further includes: using, by the terminal, a candidate location closest to the terminal in at least two preset candidate locations as the target location.

In a possible design method, the attempting, by the terminal, to obtain an indoor positioning result by using an indoor positioning service includes: extracting, by the terminal, a signal feature parameter from a currently received target radio signal, where the target radio signal is a radio signal that meets a preset indoor positioning condition in all radio signals detected by the terminal; and sending, by the terminal, the signal feature parameter to a location server, so that the location server determines the indoor positioning result of the terminal based on the signal feature parameter, thereby avoiding interference from a Wi-Fi signal that does not meet the preset indoor positioning condition to matching performed on a location fingerprint in a Wi-Fi fingerprint database of a target building.

In a possible design method, after the extracting, by the terminal, a signal feature parameter from a currently received target radio signal, the method further includes: determining, by the terminal, differences between signal feature parameters in target radio signals obtained at a same location in a preset time period and a preset location fingerprint at the location, where the location fingerprint is used to indicate distribution of a Wi-Fi signal recorded at the location in a preset Wi-Fi fingerprint database. If the differences tend to be consistent, it indicates that an actual location fingerprint at the location changes, and therefore the terminal updates the location fingerprint at the location, thereby improving accuracy of each location fingerprint in the Wi-Fi fingerprint database, and improving positioning precision in subsequent indoor positioning.

According to a second aspect, an embodiment of this application provides a terminal, including: an outdoor positioning unit, configured to obtain an outdoor positioning result by using an outdoor positioning service; a processing unit, configured to determine whether information about a satellite that provides the outdoor positioning service meets a preset condition; and an indoor positioning unit, configured to: when the information about the satellite that provides the outdoor positioning service meets the preset condition, attempt to obtain an indoor positioning result by using an indoor positioning service, where the preset condition is used to indicate that the terminal has an indoor positioning requirement; and if the indoor positioning result is successfully obtained, switch the outdoor positioning service to the indoor positioning service.

In a possible design method, the satellite information includes a quantity X of target satellites that provide a positioning service, and the target satellite is a satellite that is in all satellites that provide a positioning service for the terminal and that sends a satellite signal with a signal-to-noise ratio greater than a preset value, where $X \geq 0$; and the preset condition is: $X \leq M$ or $X \geq N$, and $0 < M < N$.

In a possible design method, the processing unit is further configured to: when $X \leq M$ or $X \geq N$, determine a distance between the terminal and a candidate building in a target area, where the target area is a preset area to which the outdoor positioning result belongs; and use a candidate building whose distance from the terminal is less than a preset value as a target building; and the indoor positioning unit is specifically configured to enable the indoor positioning service to attempt to obtain an indoor positioning result of the terminal in the target building.

In a possible design method, the outdoor positioning unit is further configured to stop providing the outdoor positioning service.

In a possible design method, the processing unit is further configured to: when the terminal fails to obtain the indoor positioning result of the terminal Y consecutive times, switch the indoor positioning service to the outdoor positioning service, where $Y \geq 1$.

In a possible design method, the outdoor positioning unit is further configured to: if the indoor positioning result is not obtained, continue to obtain the outdoor positioning result by using the outdoor positioning service.

In a possible design method, the processing unit is further configured to: determine a distance between the terminal and a target location, where the target location is a destination to which the terminal moves in a current positioning period; and adjust a length of the positioning period based on the distance between the terminal and the target location.

In a possible design method, when the distance between the terminal and the target location is longer, a value of the positioning period is larger; or when the distance between the terminal and the target location is shorter, a value of the positioning period is smaller.

In a possible design method, the processing unit is further configured to use a candidate location closest to the terminal in at least two preset candidate locations as the target location.

In a possible design method, the indoor positioning unit is specifically configured to: extract a signal feature parameter from a currently received target radio signal, where the target radio signal is a radio signal that meets a preset indoor positioning condition in all radio signals detected by the terminal; and send the signal feature parameter to a location server, so that the location server determines the indoor positioning result of the terminal based on the signal feature parameter.

In a possible design method, the processing unit is further configured to: determine differences between signal feature parameters in target radio signals obtained at a same location in a preset time period and a preset location fingerprint at the location, where the location fingerprint is used to indicate distribution of a Wi-Fi signal recorded at the location in a preset Wi-Fi fingerprint database; and if the differences tend to be consistent, update the location fingerprint at the location.

According to a third aspect, an embodiment of this application provides a terminal, including a processor, a memory, a bus, and a communications interface, where the memory is configured to store a computer executable instruction, the processor and the memory are connected through the bus, and when the terminal runs, the processor executes the computer executable instruction stored in the memory, so that the terminal performs the above positioning method.

According to a fourth aspect, an embodiment of this application provides a computer readable storage medium, where the computer readable storage medium stores an instruction, and when the instruction runs on the above terminal, the terminal is enabled to perform the above positioning method.

According to a fifth aspect, an embodiment of this application provides a computer program product including an instruction, where when the computer program product runs on the above terminal, the terminal is enabled to perform the above positioning method.

In the embodiments of this application, a name of the terminal constitutes no limitation on the device. In actual implementation, these devices may have other names, provided that functions of each device are similar to those in the embodiments of this application, that is, fall within the scope of the claims of this application and the equivalent technologies thereof.

In addition, for technical effects brought by any design method in the second aspect to the fifth aspect, refer to technical effects brought by different design methods in the first aspect. Details are not described herein again.

DETAILED DESCRIPTION OF EMBODIMENTS

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise stated, "a plurality of" means two or more than two.

An embodiment of this application provides a positioning method, and the positioning method can be applied to any terminal with a positioning function such as a mobile phone, a terminal, an augmented reality (AR) device\a virtual reality (VR) device, a tablet, a notebook computer, an ultra-mobile personal computer (UMPC), a netbook, or a personal digital assistant (PDA). Certainly, a specific form of the terminal is not limited in the following embodiments.

Figure 1:
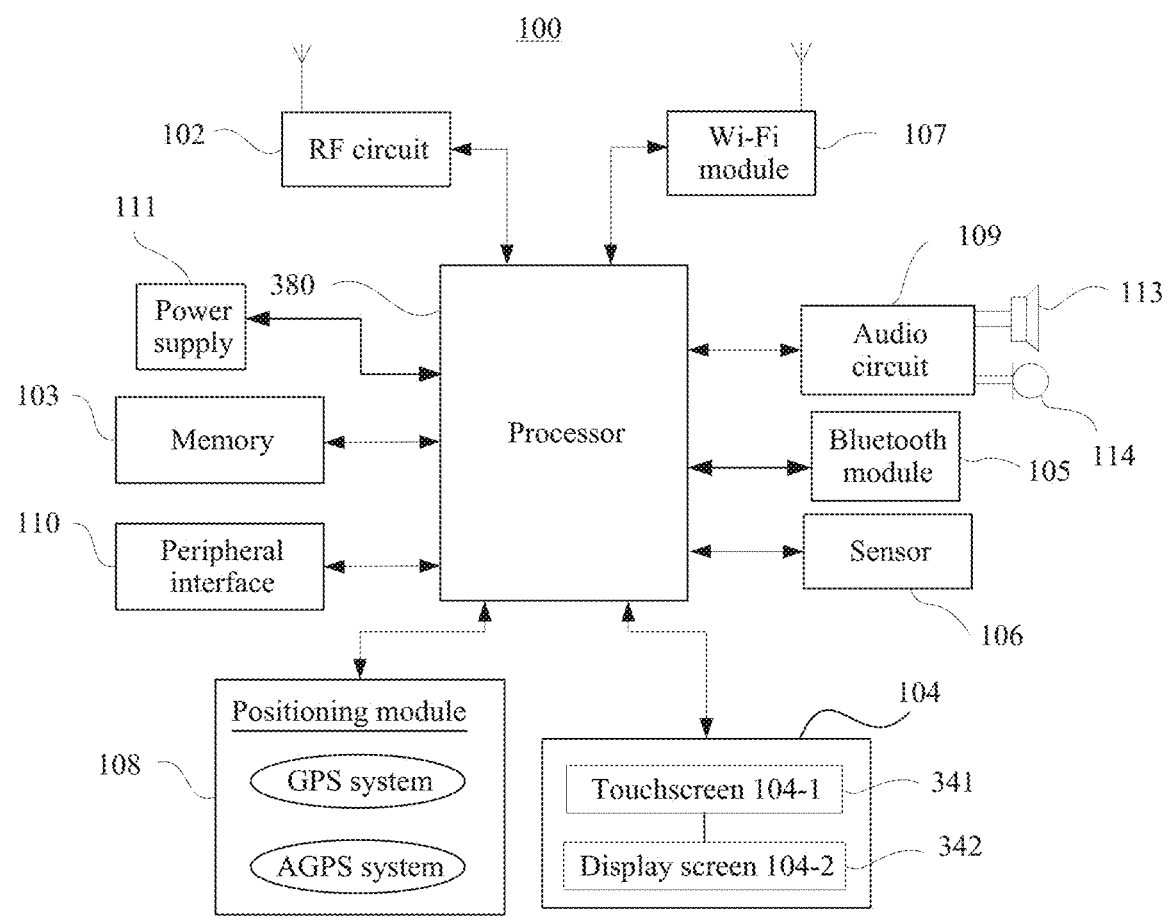
FIG. 1 is a schematic structural diagram 1 of a terminal according to an embodiment of this application.

As shown in FIG. 1, the terminal in this embodiment of this application may be a mobile phone 100.

The mobile phone 100 is used as an example to describe this embodiment in detail below. It should be understood that the mobile phone 100 shown in the figure is merely an example of the terminal, and the mobile phone 100 may have more or fewer components than those shown in the figure, may combine two or more components, or may have different component configurations.

As shown in FIG. 1, the mobile phone 100 may specifically include components such as a processor 101, a radio frequency (RF) circuit 102, a memory 103, a touchscreen 104, a Bluetooth module 105, one or more sensors 106, a Wi-Fi module 107, a positioning module 108, an audio circuit 109, a peripheral interface 110, and a power supply system 111. These components may perform communication through one or more communications buses or signal cables (not shown in FIG. 1). A person skilled in the art may understand that the hardware structure shown in FIG. 1 does not constitute a limitation on the mobile phone, and the mobile phone 10 may include more or fewer components than those shown in the figure, may combine some components, or may have different component arrangements.

The following describes the components of the mobile phone 100 in detail with reference to FIG. 1.

The processor 101 is a control center of the mobile phone 100. The processor 101 is connected to all parts of the mobile phone 100 through various interfaces and lines, and performs various functions of the mobile phone 100 and processes data by running or executing an application program stored in the memory 103 and invoking data stored in the memory 103. In some embodiments, the processor 101 may include one or more processing units. For example, the processor 101 may be a Kirin 960 chip manufactured by Huawei Technologies Co., Ltd. In some embodiments of this application, the processor 101 may further include a fingerprint verification chip, configured to verify a collected fingerprint.

The radio frequency circuit 102 may be configured to receive and send a radio signal in an information receiving and sending process or in a call process. In particular, after receiving downlink data from a base station, the radio frequency circuit 102 may send the downlink data to the processor 101 for processing. In addition, the radio frequency circuit 102 sends uplink data to the base station. The radio frequency circuit usually includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to a global system for mobile communications, a general packet radio service, code division multiple access, wideband code division multiple access, long term evolution, an email, a short message service, and the like.

The memory 103 is configured to store an application program and data. The processor 101 performs various functions of the mobile phone 100 and process data by running the application program and the data stored in the memory 103. The memory 103 mainly includes a program storage area and a data storage area, where the program storage area may store an operating system, and an application program required by at least one function (such as a sound play function or an image play function). The data storage area may store data (such as audio data or a phone book) created based on use of the mobile phone 100. In addition, the memory 103 may include a high-speed random access memory (RAM), and may further include a nonvolatile memory such as a magnetic disk storage device, a flash memory, or another volatile solid-state storage device. The memory 103 may store various operating systems such as an iOS® operating system developed by Apple Inc and an Android® operating system developed by Google Inc. The memory 103 may be independent, and is connected to the processor 101 through the communications bus. Alternatively, the memory 103 may be integrated with the processor 101.

The touchscreen 104 may specifically include a touchscreen 104-1 and a display screen 104-2.

The touchscreen 104-1 may collect a touch event performed by a user of the mobile phone 100 on the mobile phone 100 or near the mobile phone 100 (for example, an operation performed by the user on the touchscreen 104-1 or near the touchscreen 104-1 by using any proper object such as a finger or a stylus), and send collected touch information to another component (for example, the processor 101). The touch event performed by the user near the touchscreen 104-1 may be referred to as a floating touch. The floating touch may mean that the user does not need to directly touch the touchscreen for selecting, moving, or dragging an object (for example, an icon), and the user only needs to be near the terminal to execute a desired function. In addition, the touchscreen 104-1 may be implemented by using a plurality of types, such as a resistive type, a capacitive type, an infrared type, and a surface acoustic wave type.

The display screen (also referred to as a display screen) 104-2 may be configured to display information entered by the user or information provided for the user, and various menus of the mobile phone 100. The display screen 104-2 may be configured in a form of a liquid crystal display, an organic light-emitting diode, or the like. The touchscreen 104-1 may cover the display screen 104-2. When detecting the touch event on the touchscreen 104-1 or near the touchscreen 104-1, the touchscreen 104-1 transmits the touch event to the processor 101 to determine a type of the touch event. Then, the processor 101 may provide corresponding visual output on the display screen 104-2 based on the type of the touch event. Although the touchscreen 104-1 and the display screen 104-2 in FIG. 1 are used as two independent components to implement an input function and an output function of the mobile phone 100, in some embodiments, the touchscreen 104-1 and the display screen 104-2 may be integrated to implement the input function and the output function of the mobile phone 100. It may be understood that the touchscreen 104 is formed by stacking a plurality of layers of materials. In this embodiment of this application, only the touchscreen (layer) and the display screen (layer) are displayed, and another layer is not recorded in this embodiment of this application. In addition, the touchscreen 104-1 may be configured on the front of the mobile phone 100 in a form of a full panel, and the display screen 104-2 may also be configured on the front of the mobile phone 100 in a form of a full panel. In this way, a bezel-less structure can be implemented on the front of the mobile phone.

In addition, the mobile phone 100 may further have a fingerprint recognition function. For example, a fingerprint collection device may be configured on the back of the mobile phone 100 (for example, below a rear-facing camera), or a fingerprint collection device may be configured on the front of the mobile phone 100 (for example, below the touchscreen 104). For another example, a fingerprint collection device may be configured in the touchscreen 104 to implement the fingerprint recognition function. In other words, the fingerprint collection device may be integrated with the touchscreen 104 to implement the fingerprint recognition function of the mobile phone 100. In this case, the fingerprint collection device is configured in the touchscreen 104, and may be a part of the touchscreen 104, or the fingerprint collection device may be configured in the touchscreen 104 in another manner. A main component of the fingerprint collection device in this embodiment of this application is a fingerprint sensor. The fingerprint sensor may use any type of sensing technology, including but not limited to an optical sensing technology, a capacitive sensing technology, a piezoelectric sensing technology, an ultrasonic sensing technology, and the like.

The mobile phone 100 may further include the Bluetooth module 105, configured to exchange data between the mobile phone 100 and another terminal (such as a mobile phone or a smartwatch) at a short distance from the mobile phone 100.

The Bluetooth module in this embodiment of this application may be an integrated circuit, a Bluetooth chip, or the like.

The mobile phone 100 may further include at least one type of sensor 106, such as a light sensor, a motion sensor, or another sensor. Specifically, the light sensor may include an ambient light sensor and a proximity sensor. The ambient light sensor may adjust luminance of the display screen of the touchscreen 104 based on brightness of ambient light, and the proximity sensor may turn off a power supply of the display screen when the mobile phone 100 moves to an ear. As one type of motion sensor, an accelerometer sensor may detect acceleration values in various directions (generally on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone 100, and details are not described herein.

The Wi-Fi module 107 is configured to provide, for the mobile phone 100, network access that complies with a Wi-Fi-related standard protocol. The mobile phone 100 may be connected to a Wi-Fi access point by using the Wi-Fi module 107, to help the user receive and send an email, browse a web page, access streaming media, and the like. The Wi-Fi module 107 provides wireless broadband Internet access for the user. In some other embodiments, the Wi-Fi module 107 may also be used as a Wi-Fi wireless access point, and may provide Wi-Fi network access for another terminal.

The positioning module 108 is configured to provide a positioning service by providing a geographical location for the mobile phone 100. It may be understood that the positioning module 108 may be specifically a receiver of a positioning system such as a global positioning system (GPS), a BeiDou navigation satellite system, or a Russian GLONASS. After receiving the geographical location sent by the foregoing positioning system, the positioning module 108 sends the information to the processor 101 for processing, or sends the information to the memory 103 for storage.

In some other embodiments, the positioning module 108 may be alternatively a receiver of an assisted global positioning system (AGPS). The AGPS system serves as an assisted server to assist the positioning module 108 in completing ranging and positioning services. In this case, the assisted positioning server communicates with the positioning module 108 (namely, a GPS receiver) of the terminal such as the mobile phone 100 by using a wireless communications network, to provide positioning assistance.

In some other embodiments, the positioning module 108 may be alternatively a positioning technology based on a Wi-Fi access point or a Bluetooth function. For example, in Wi-Fi positioning, each Wi-Fi access point has a globally unique MAC address, and the terminal may scan and collect a broadcast signal of a surrounding Wi-Fi access point when Wi-Fi is enabled. Therefore, the terminal may obtain a MAC address broadcast by the Wi-Fi access point. The terminal sends data (for example, the MAC address) that can identify the Wi-Fi access point to a location server by using the wireless communications network. The location server retrieves a geographical location of each Wi-Fi access point, calculates a geographical location of the terminal based on strength of the Wi-Fi broadcast signal, and sends the geographical location to the positioning module 108 of the terminal.

In this embodiment of this application, the terminal may identify, by using the positioning module 108, that a current positioning scenario is an indoor positioning scenario or an outdoor positioning scenario. Further, the terminal may select a positioning method with relatively high precision in the current positioning scenario to locate the terminal. For example, when the positioning module 108 provides an outdoor positioning service for the terminal based on a GPS signal, if it is determined that the current positioning scenario is an indoor positioning scenario, the terminal may be triggered to attempt to perform indoor positioning on the terminal by using a detected Wi-Fi signal. If an indoor positioning result can be successfully obtained, the terminal may stop performing outdoor positioning on the terminal, and switch a current positioning service to an indoor positioning service. Certainly, if the indoor positioning result is not obtained, the terminal may continue to perform outdoor positioning on the terminal by using the GPS signal.

It may be learned that, when performing positioning, the terminal does not passively wait for a currently used positioning service to fail before the terminal is triggered to use a new positioning service for positioning. Instead, the terminal actively detects the current positioning scenario in a positioning process, and then selects the positioning method with relatively high precision in the current positioning scenario to locate the terminal, thereby ensuring positioning precision, reducing a time consumed by switching a positioning service between an indoor area and an outdoor area, and improving user's use experience.

The audio circuit 109, a speaker 113, and a microphone 114 may provide an audio interface between the user and the mobile phone 100. The audio circuit 109 may convert received audio data into an electrical signal and transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identity module card). For example, the terminal is connected to the mouse through a universal serial bus (USB) interface, and the terminal is connected, by using a metal contact on a card slot of the subscriber identity module card, to the subscriber identity module (SIM) card provided by a telecommunications operator. The peripheral interface 110 may be configured to couple the external input/output peripheral device to the processor 101 and the memory 103.

The mobile phone 100 may further include a power supply apparatus 111 (for example, a battery and a power supply management chip) that supplies power to the components. The battery may be logically connected to the processor 101 by using the power supply management chip, so that functions such as charging, discharging, and power consumption management are implemented by using the power supply apparatus 111. Although not shown in FIG. 1, the mobile phone 100 may further include a camera (a front-facing camera and/or a rear-facing camera), a camera flash, a micro projection apparatus, a near field communication (NFC) apparatus, and the like. Details are not described herein.

Further, the mobile phone 100 may run in an operating system such as Android or IOS. This is not limited in this embodiment of this application.

Figure 2:
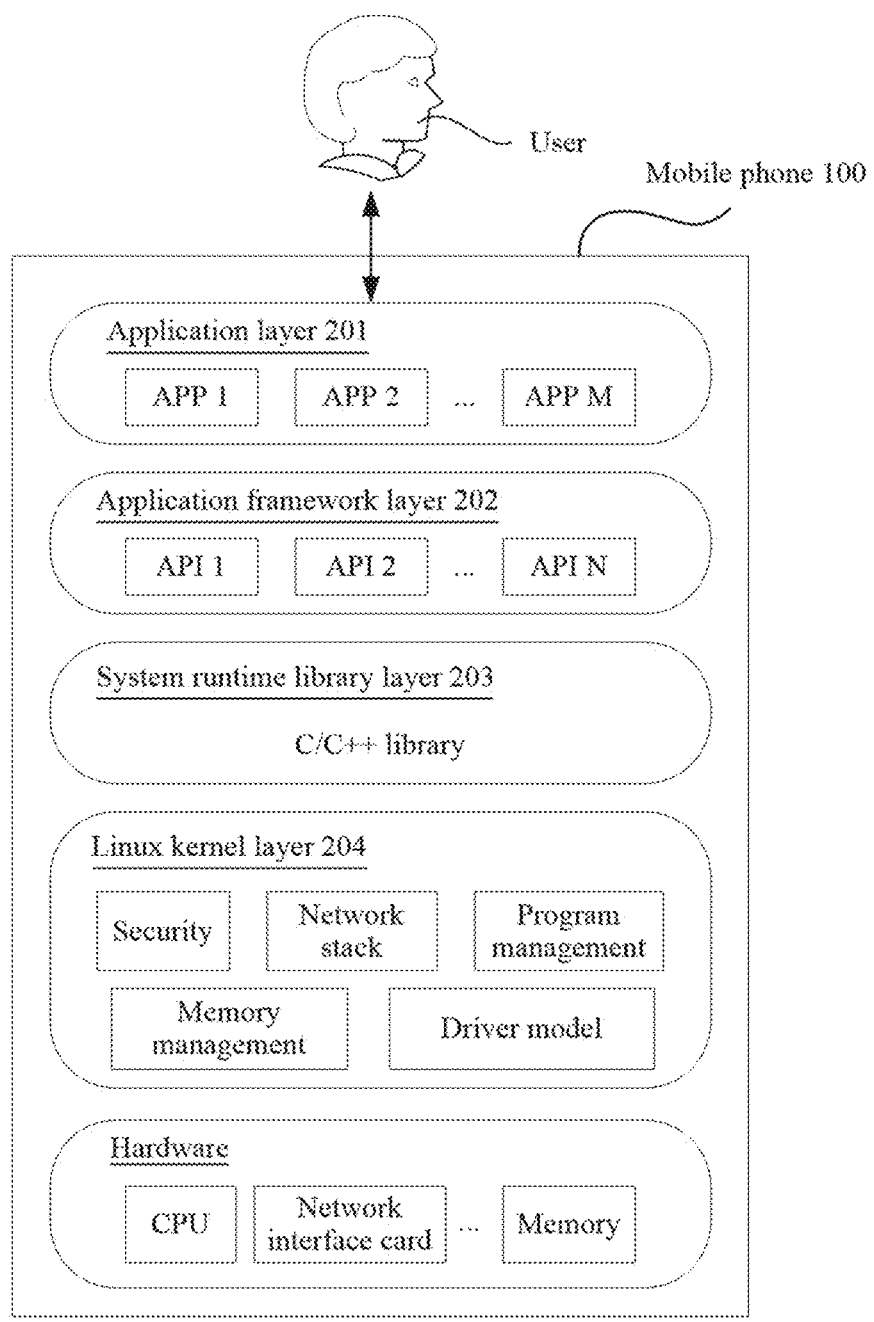
FIG. 2 is a schematic architectural diagram of an Android system according to an embodiment of this application.

The Android operating system is used as an example. As shown in FIG. 2, the Android operating system may be divided into four layers, which are an application layer 201 (namely, an APP layer), an application framework layer 202 (namely, a framework layer), a system runtime library layer 203 (namely, a libraries layer), and a Linux kernel layer 204 from an upper layer to a lower layer.

The Linux kernel layer 204 may be used to control functions of the mobile phone 100, such as security (Security), memory management (Memory Management), program management (Process Management), a network stack (Network Stack), and a driver model (Driver Model). The Linux kernel layer 204 also serves as an abstraction layer between a hardware stack (such as a CPU, a network interface card, and a memory) and a software stack, and may hide specific hardware details to provide a unified service for an upper layer (the system runtime library layer 203, the application framework layer 202, and the application layer 201).

The system runtime library layer 203 includes some C/C++ libraries, such as a media library, a system C library, and a display management library (Surface Manager). These libraries may be used by different components in the Android system, and the system runtime library layer 203 may serve a developer by using the framework layer 202.

The framework layer 202 provides an API (Application Programming Interface, application programming interface) framework used by a fully accessible application program for the developer. Specifically, the framework layer 202 provides a large quantity of APIs for developing an application program. An APP that meets a related service requirement may be constructed by invoking a corresponding API.

The application layer 201 mainly includes an APP written in a java language, for example, a map APP proving a positioning function. When operating an operation interface on an APP, a user interacts with the system runtime library layer 203 or the Linux kernel layer 204 by invoking a related API at the framework layer 202, to implement a function corresponding to the operation interface.

In some embodiments of this application, the positioning method provided in this application may run at the application layer 201 or the framework layer 202 in a form of a software development kit (Software Development Kit, SDK) 205. The SDK is a set of development tools used when some software engineers build application software for a specific software package, a software framework, a hardware platform, an operating system, and the like. The SDK may provide some files of an API for an APP design language, or may include complex hardware that can communicate with an embedded system.

Figure 3A:
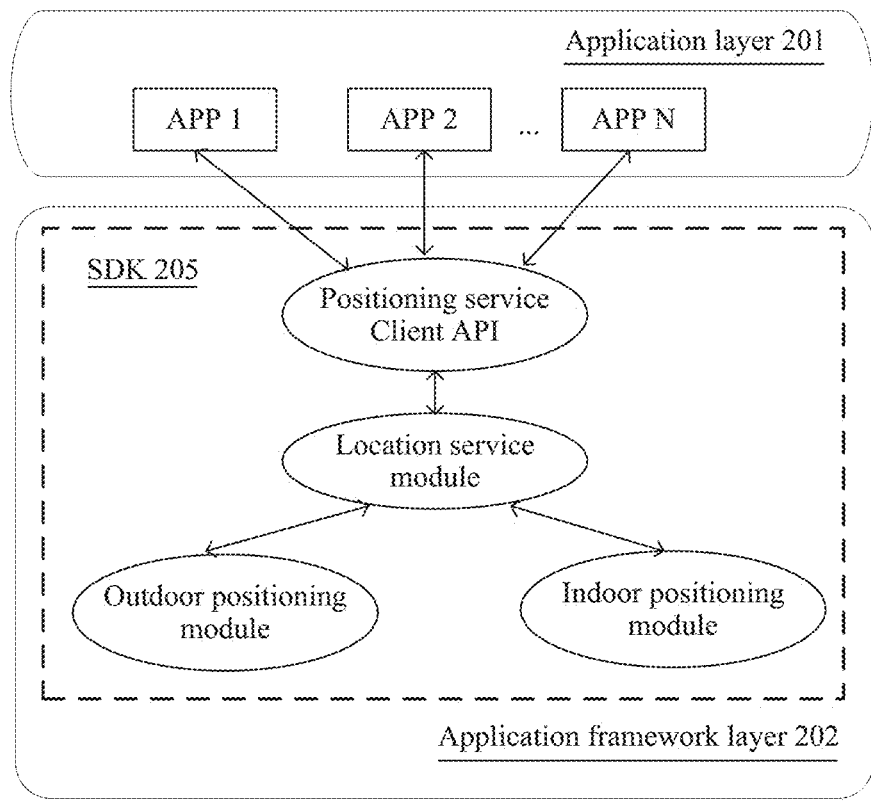
FIG. 3A is a schematic architectural diagram 1 of an SDK in an Android system according to an embodiment of this application.

As shown in FIG. 3A, the SDK 205 may be integrated in the framework layer 202 as a system service to provide a positioning service for each APP at the application layer 201.

Specifically, the SDK 205 may include a positioning service client API (Location Client API), a location service module (Location Server), an outdoor positioning (Outdoor Positioning) module, and an indoor positioning (Indoor Positioning) module.

The positioning service client API may be configured to provide an API for an application that provides a positioning service at the application layer 201, and any APP at the application layer 201 may implement an indoor positioning service or an outdoor positioning service by invoking the API in the SDK 205.

The location service module may be configured to identify that a current positioning scenario is an indoor positioning scenario or an outdoor positioning scenario, and switch between the indoor positioning service and the outdoor positioning service based on the current positioning scenario. Certainly, the location service module may be further configured to enable or disable the indoor positioning service and the outdoor positioning service, and receive positioning results (for example, an indoor positioning result and an outdoor positioning result) returned by the indoor positioning service and the outdoor positioning service. This is not limited in this embodiment of this application.

The outdoor positioning module is configured to perform outdoor positioning on the terminal to obtain the outdoor positioning result. For example, the outdoor positioning module may perform outdoor positioning based on a GPS service or a network service provided by a base station, or may measure and count, based on a pedestrian navigation (Pedestrian Dead Reckoning, PDR) technology, a step quantity, a step size, and a direction of a user to walk, to reckon information such as a walking track and a location of the user.

The indoor positioning module is configured to perform indoor positioning on the terminal to obtain the indoor positioning result. For example, the indoor positioning module may perform indoor positioning based on a Wi-Fi service or a Bluetooth service. Certainly, the indoor positioning module may also measure and count, based on the PDR technology, the step quantity, the step size, and the direction of the user to walk, to reckon the information such as the walking track and the location of the user. This is not limited in this embodiment of this application.

Figure 3B:
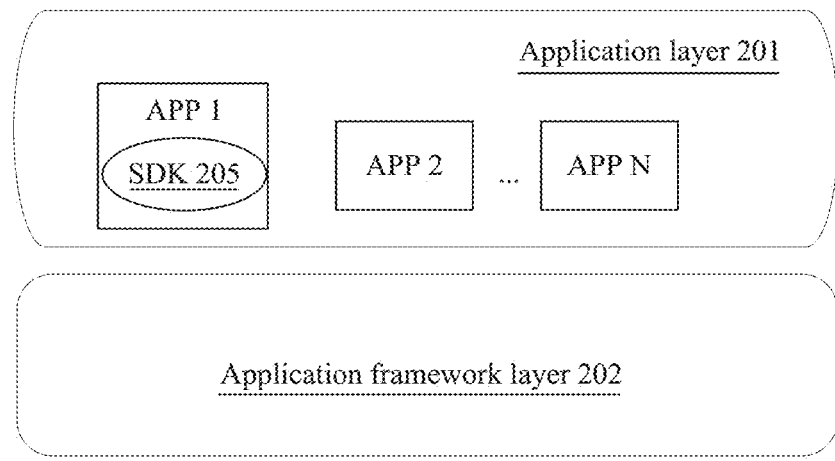
FIG. 3B is a schematic architectural diagram 2 of an SDK in an Android system according to an embodiment of this application.

Alternatively, as shown in FIG. 3B, the SDK 205 may be integrated into one or more specific Apps at the application layer 201, to provide a positioning service for these specific Apps. For example, when downloading an APP 1 from an application store, the user may simultaneously download the SDK 205 that provides a positioning service for the APP 1. Further, the terminal may install the SDK 205 in the APP 1. When subsequently implementing a positioning service, the APP 1 may identify the indoor positioning scenario and the outdoor positioning scenario by invoking the positioning service client API in the SDK 205, and provide a corresponding positioning service for the APP 1.

It should be noted that, in this embodiment of this application, if a positioning service provided by the terminal is not specifically specified as the indoor positioning service or the outdoor positioning service, the positioning service may be the indoor positioning service or the outdoor positioning service. This is not limited in this embodiment of this application.

Figure 4:
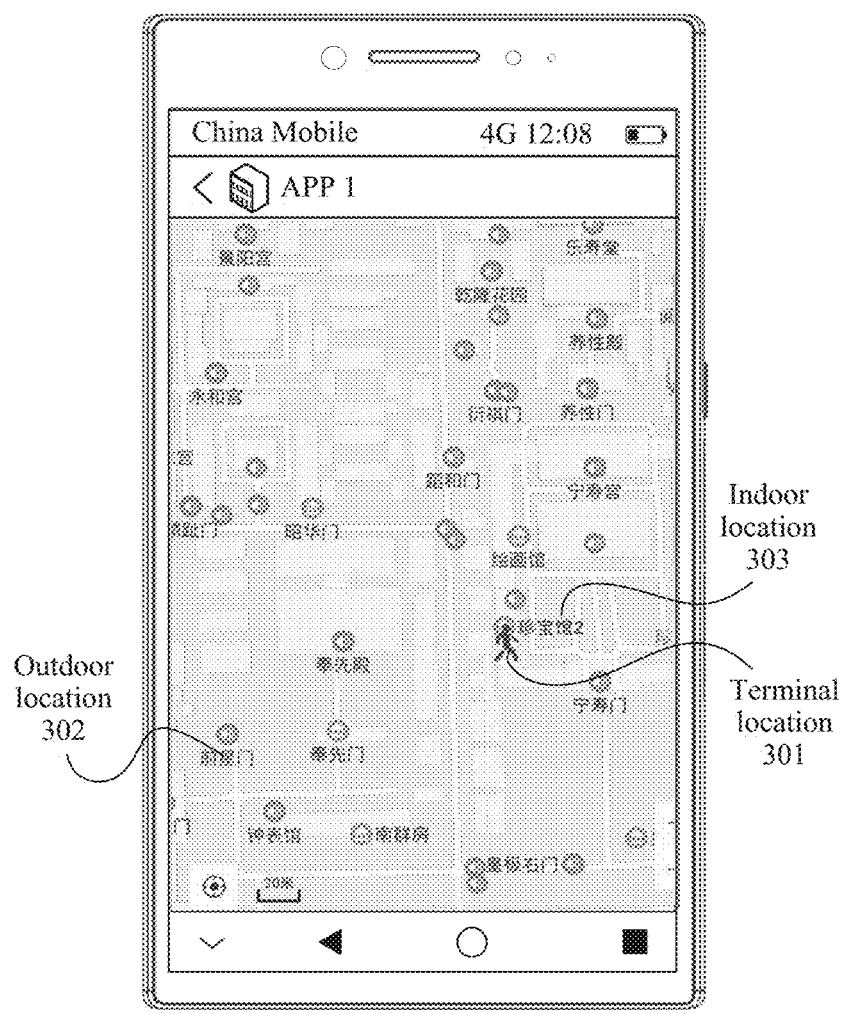
FIG. 4 is a schematic diagram 1 of an application scenario of a positioning method according to an embodiment of this application.

Specifically, the positioning method provided in this embodiment of this application may be applied to a process in which a positioning APP provides a positioning service for a user. For example, as shown in FIG. 4, when touring a scenic spot, the user may open the APP 1 to take an independent tour. The APP 1 may perform real-time positioning on the terminal to determine a current location (namely, a terminal location 301) of the user, and then automatically play a voice introduction of a scenic spot closest to the terminal location 301.

In a positioning process, still as shown in FIG. 4, some scenic spots are at an outdoor location 302 such as the Qianxing gate or the Fengxian gate, and some other scenic spots are at an indoor location 303 such as a treasury exhibition hall or a painting exhibition hall. In this case, the user often switches between the indoor location 303 and the outdoor location 302 when touring each scenic spot. For example, the user previously tours the Qianxing gate (an outdoor area), and after the user enters the treasury exhibition hall (an indoor area), the terminal needs to automatically identify a change of a current positioning scenario, to switch between an indoor positioning service and an outdoor positioning service for different positioning scenarios. In addition, if a time for identifying the change of the positioning scenario is excessively long (for example, 30 seconds), the user may have entered a new scenic spot, and consequently the user misses a voice introduction of the related scenic spot.

Figure 5:
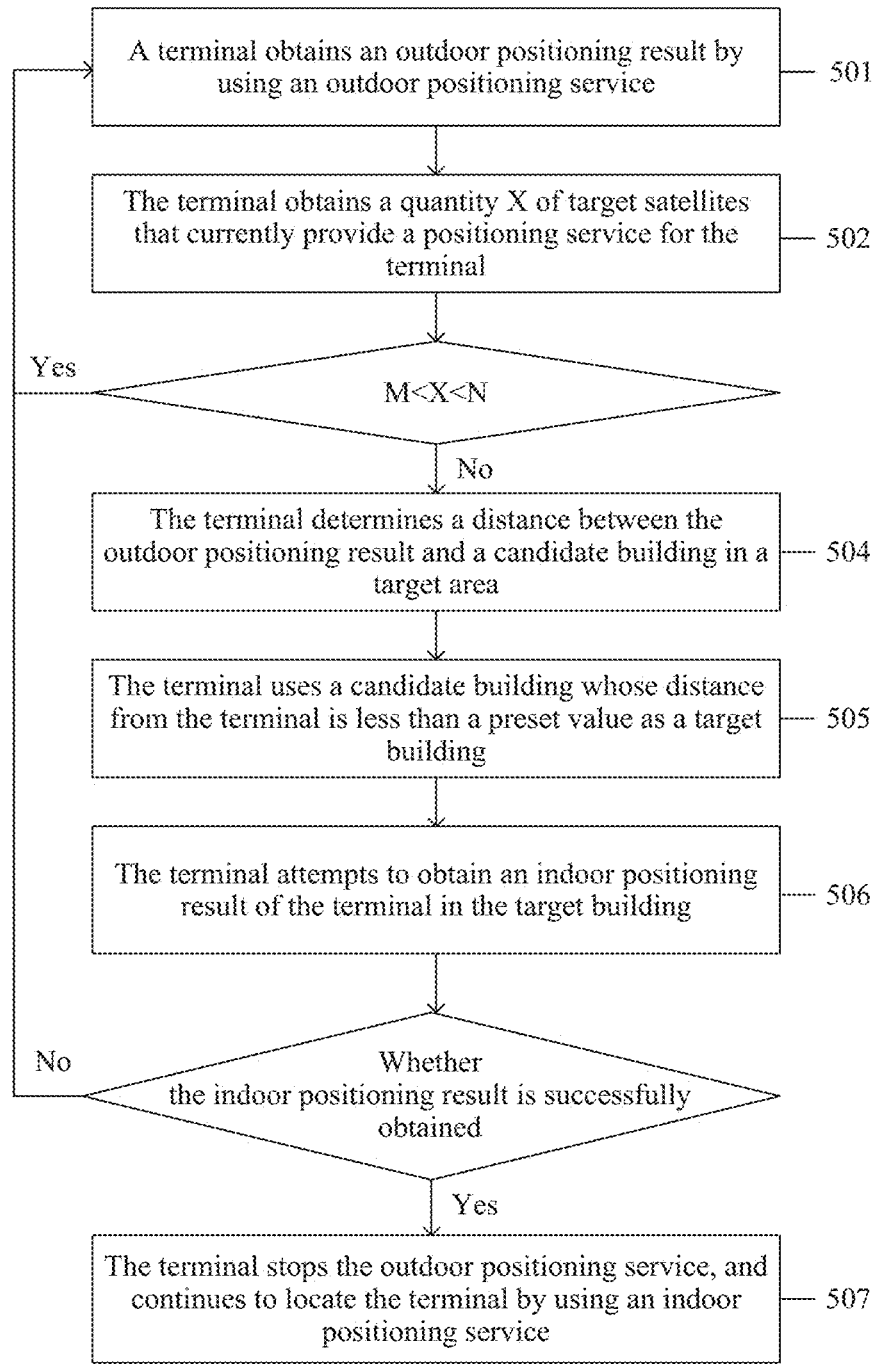
FIG. 5 is a schematic flowchart of a positioning method according to an embodiment of this application.

In view of the above, an embodiment of this application provides a positioning method. As shown in FIG. 5, the method includes the following steps.

501. A terminal obtains an outdoor positioning result by using an outdoor positioning service.

Figure 6:
FIG. 6 is a schematic diagram 2 of an application scenario of a positioning method according to an embodiment of this application.

Specifically, a satellite positioning chip (for example, a GPS chip) that is used to provide the outdoor positioning service may be disposed in the terminal. Further, when a user triggers a positioning service on the terminal, for example, when the user opens the foregoing APP 1, the terminal may trigger the satellite positioning chip to send a positioning request to one or more GPS satellites (there are a total of 24 GPS satellites worldwide). Further, the GPS satellite obtains a location of a ground point (for example, longitude and latitude coordinates of the ground point) by using a distance intersection between a spatially distributed satellite and the ground point, namely, the outdoor positioning result, and returns the outdoor positioning result to the satellite positioning chip. In addition, the terminal may further display the currently obtained outdoor positioning result on an electronic map. As shown in FIG. 6, the user takes an independent tour by using the APP 1. After opening the APP 1, the terminal may obtain a current outdoor positioning result by using the outdoor positioning service. For example, if the outdoor positioning result indicates that the user is currently at the Qianxing gate, the APP 1 may be triggered to automatically play a voice introduction of the Qianxing gate.

It should be noted that a positioning service is usually periodically triggered by the terminal. For example, the outdoor positioning service is triggered every two seconds to attempt to obtain an outdoor positioning result. If the terminal does not obtain the outdoor positioning result in step 501 (for example, the outdoor positioning result cannot be obtained when a GPS signal is relatively weak), the terminal may wait for a next positioning period to continue to cyclically perform step 501 for outdoor positioning. This is not limited in this embodiment of this application.

502. The terminal obtains a quantity X of target satellites that currently provide a positioning service for the terminal, where X≥0.

Usually, quantities of satellites that can provide an effective positioning service are different in different positioning scenarios. For example, in an outdoor positioning scenario, a quantity of satellites that can provide an effective positioning service is usually 12 to 20. In an indoor positioning scenario, a quantity of satellites that can provide an effective positioning service is usually 0 to 5. In a positioning scenario in which an indoor area and an outdoor area are intersected, a quantity of satellites that can provide an effective positioning service is usually 6 to 12.

Therefore, after obtaining a current location of the terminal (namely, the outdoor positioning result), the terminal may further determine the quantity X of target satellites that currently provide a positioning service for the terminal, and further identify, based on the quantity X of target satellites, that a current positioning scenario is an indoor positioning scenario or an outdoor positioning scenario.

The target satellites are one or more satellites that are in all satellites that provide a positioning service for the terminal and that have a satellite signal (for example, a GPS signal) with a signal-to-noise ratio greater than a threshold, where the satellite signal is received by the terminal, and the satellite that has the satellite signal with the signal-to-noise ratio greater than the threshold can provide an effective positioning service for the terminal. Certainly, there may be a plurality of methods for determining the target satellite based on a signal-to-noise ratio of a satellite signal. For example, when the signal-to-noise ratio of the satellite signal meets a specific function relationship, the satellite that provides the satellite signal may be used as the target satellite. This is not limited in this embodiment of the present invention.

Figure 7:
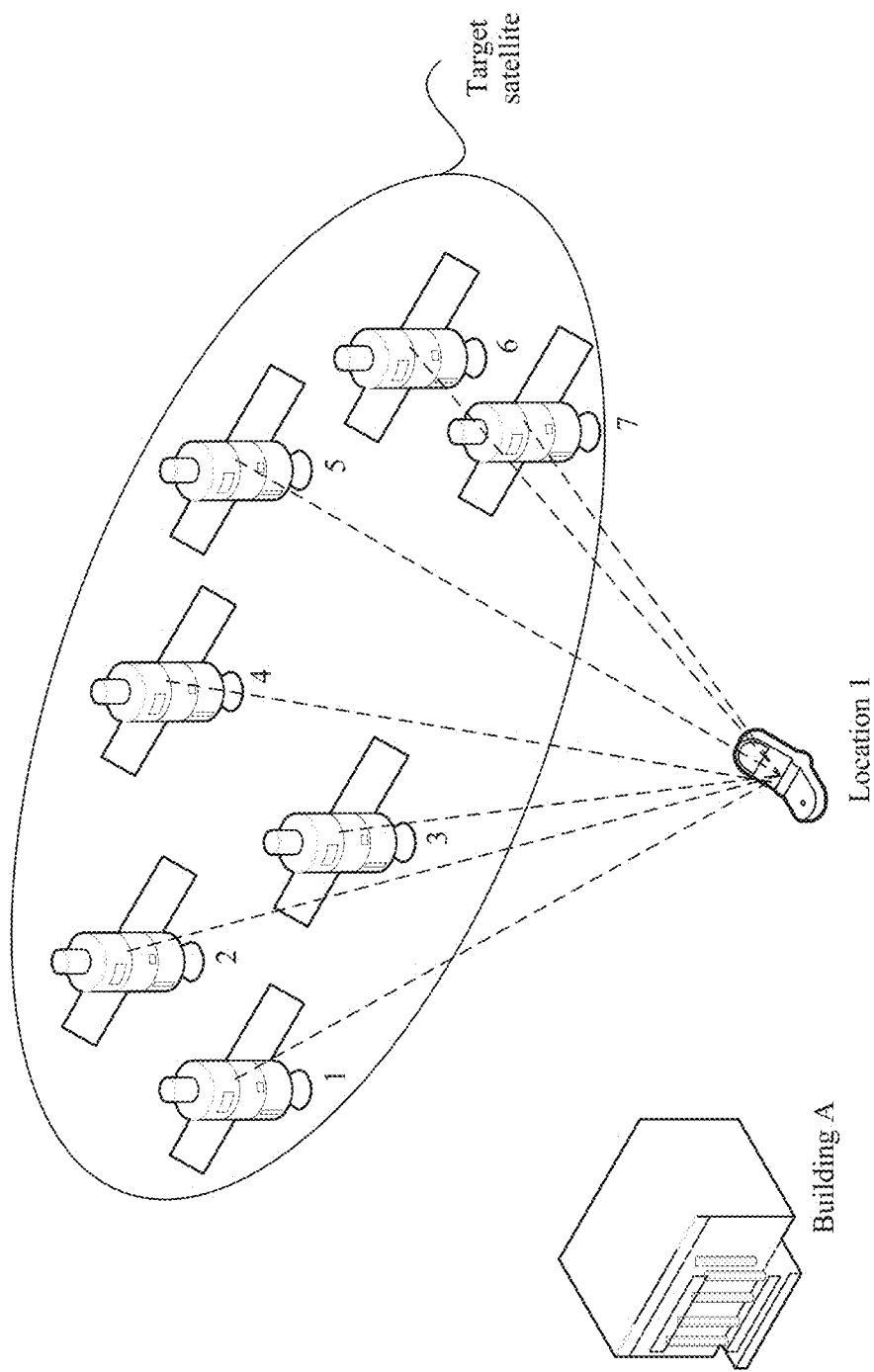
FIG. 7 is a schematic diagram 3 of an application scenario of a positioning method according to an embodiment of this application.

For example, as shown in FIG. 7, when the terminal obtains the outdoor positioning result by using the outdoor positioning service at a location 1, satellites that provide the outdoor positioning service for the terminal include a GPS satellite 1 to a GPS satellite 7. In addition, a signal-to-noise ratio of a GPS signal sent by each of the GPS satellite 1 to the GPS satellite 7 that is received by the terminal is greater than the threshold, and therefore the terminal may use the GPS satellite 1 to the GPS satellite 7 as the target satellites, that is, the quantity X of target satellites that currently provide a positioning service for the terminal is 7.

It should be noted that, when obtaining the outdoor positioning result, the terminal may determine the quantity X of target satellites based on a received satellite signal sent by each satellite, or after obtaining the outdoor positioning result, the terminal may obtain a satellite signal from the satellite positioning chip in the terminal again to determine the quantity X of target satellites. In other words, an execution sequence between step 501 and step 502 is not limited in this embodiment of this application.

In addition, a GPS signal amplifier may be disposed in some indoor areas, and the GPS signal amplifier may be configured to amplify a GPS signal sent by a GPS satellite. The GPS signal amplifier usually simulates a real GPS satellite by using a virtual GPS satellite. A quantity of simulated GPS satellites is usually greater than a total quantity of real GPS satellites (that is, greater than 24). Therefore, when the quantity X of target satellites that is obtained by the terminal is greater than a specific quantity (for example, greater than 20), the current positioning scenario may be considered as an indoor positioning scenario.

Certainly, the terminal may further identify the current positioning scenario based on other information about a satellite that provides the outdoor positioning service, for example, one or more of GPS signal strength, a transmission delay, and a noise factor. This is not limited in this embodiment of this application.

503. When M<X<N, the terminal continues to cyclically perform step 501 and step 502 to obtain the outdoor positioning result by using the outdoor positioning service, where 0<M<N.

When M<X<N, for example, M=6 and N=20, still as shown in FIG. 7, the quantity X of target satellites is 7, indicating that the quantity of target satellites that currently provide a positioning service is not particularly small or large. In this case, the terminal is usually in an outdoor area, that is, the current positioning scenario is an outdoor positioning scenario. Therefore, the terminal does not need to switch the current outdoor positioning service to an indoor positioning service, and the terminal may continue to cyclically perform step 501 and step 502 to obtain the outdoor positioning result by using the outdoor positioning service.

504. When X≤M or X≥N, the terminal determines a distance between the outdoor positioning result and a candidate building in a target area, where the target area is a preset area to which the outdoor positioning result belongs.

Figure 8:
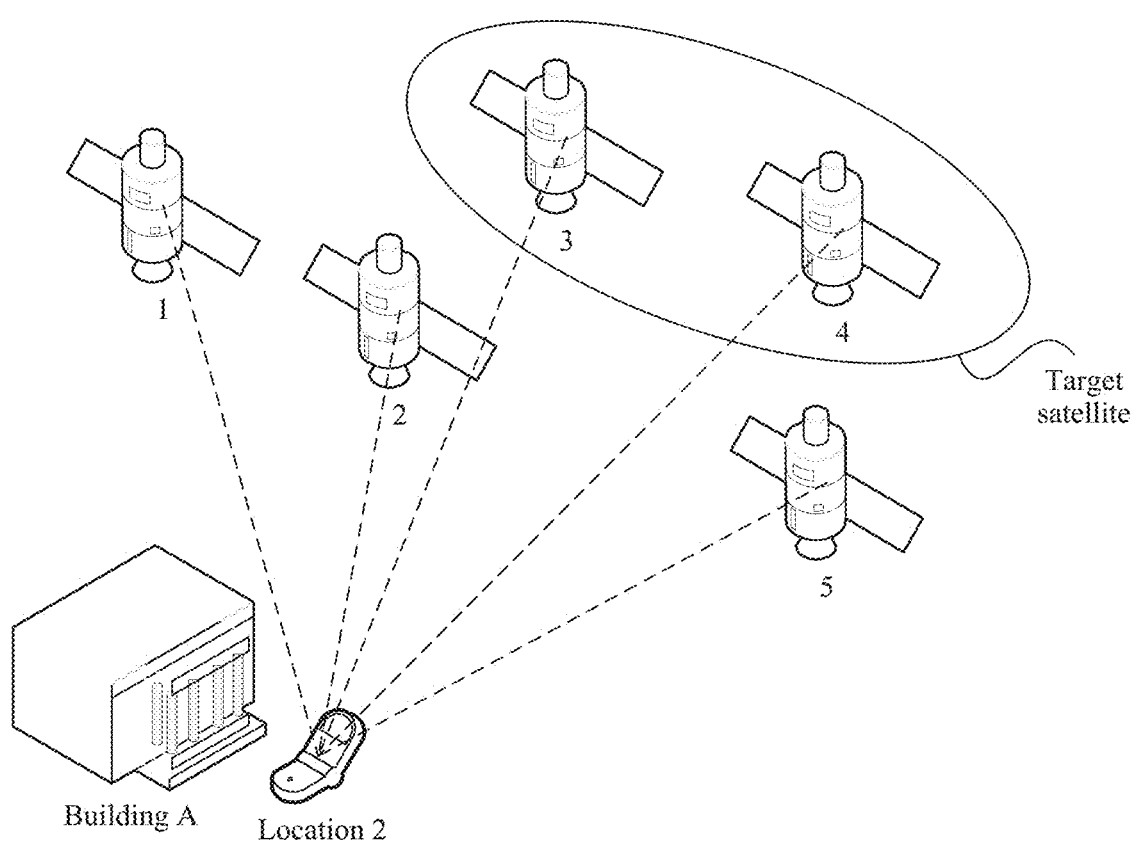
FIG. 8 is a schematic diagram 4 of an application scenario of a positioning method according to an embodiment of this application.

When $X \leq M$ or $M \geq N$, for example, M=6 and N=20, as shown in FIG. 8, the user gradually approaches a building A by carrying the terminal. When the terminal is at a location 2, if the obtained quantity X of target satellites is 2, it indicates that a relatively small quantity of satellites provide an effective positioning service for the terminal at the location 2. In this case, the terminal is usually in an indoor area or at a location near an indoor area.

To determine that the terminal is specifically in which building or close to which building, the terminal may further search for specific candidate buildings that provide the indoor positioning service in the target area to which the outdoor positioning result belongs.

Figure 9:
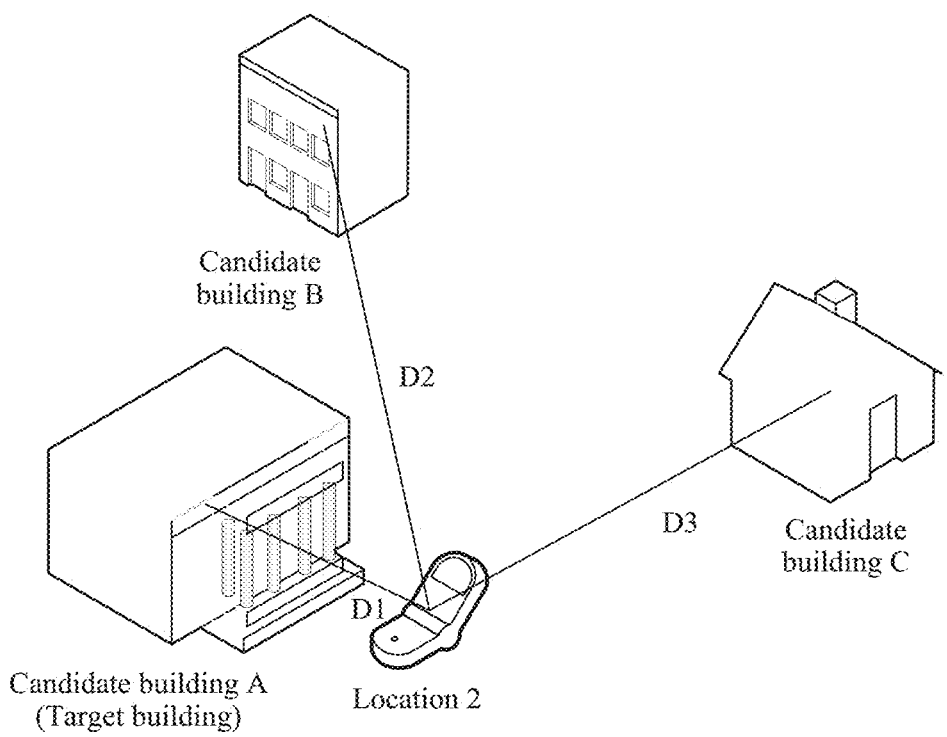
FIG. 9 is a schematic diagram 5 of an application scenario of a positioning method according to an embodiment of this application.

Specifically, GPS coordinates of a candidate building that provides the indoor positioning service in each area (for example, each city, or each district and county in each city) may be prestored in the terminal. As shown in Table 1, GPS coordinates of each candidate building that provides the indoor positioning service in an area 1 and an area 2 are prestored in the terminal. Further, when the quantity of target satellites meets $X \leq M$ (or $X \geq N$), the terminal may use an area to which the outdoor positioning result belongs as the target area based on the outdoor positioning result obtained in step 501. For example, an area to which the terminal belongs is the area 1, and the area 1 includes a candidate building A, a candidate building B, and a candidate building C that provide the indoor positioning service. Therefore, in step 504, the current location of the terminal is the outdoor positioning result obtained in step 201. As shown in FIG. 9, the terminal may separately calculate a distance D1 between the current terminal and the building A, a distance D2 between the current terminal and the candidate building B, and a distance D3 between the current terminal and the candidate building C.

TABLE 1

|  | Candidate buildings | GPS coordinates |
| --- | --- | --- |
| Area 1 | Candidate building A | E108° 54'22", N34° 12'58" |
|  | Candidate building B | E105° 20'15", N34° 18'6" |
|  | Candidate building C | E110° 20'15", N34° 39'08" |
| Area 2 | Candidate building D | E112° 54'45", N33° 18'24" |
|  | Candidate building E | E112° 21'15", N33° 40'23" |

It should be noted that a list of candidate buildings that provide the indoor positioning service in each area shown in Table 1 may be automatically downloaded by the terminal from a network side when the terminal is powered on. Alternatively, when the terminal moves to a new area, the terminal is triggered to automatically download a candidate building list corresponding to the new area from a network side. Alternatively, the user may manually add or download a candidate building list on a setting interface of a positioning service of the terminal. This is not limited in this embodiment of this application.

In addition, when $X \geq N$, for example, when X=25 and N=20, it indicates that a relatively large quantity of target satellites provide a positioning service for the terminal, and this is usually because a GPS signal amplifier is installed in an indoor area. Therefore, when $X \geq N$, it may also be considered that the current positioning scenario is an indoor positioning scenario, and the terminal may be triggered to further determine the distance between the outdoor positioning result obtained in step 501 and the candidate building in the target area.

505. The terminal uses a candidate building whose distance from the terminal is less than a preset value as a target building.

Still as shown in FIG. 9, after calculating the distance between the terminal and the candidate building A, the distance between the terminal and the candidate building B, and the distance between the terminal and the candidate building C in the area 1, the terminal may compare the obtained distances D, D2, and D3 with the preset value. When a distance is less than the preset value, for example, when the distance D1 between the terminal and the candidate building A is less than the preset value 20 meters, it indicates that the terminal is very close to the candidate building A. Therefore, the terminal may use the candidate building A as the target building. Subsequently, the terminal may further determine a location of the terminal in the target building by using the indoor positioning service.

It should be noted that there may be one or more target buildings determined by the terminal. This is not limited in this embodiment of this application.

In this case, by performing step 504 and step 505, the terminal may trigger, based on only the quantity X of target satellites, the terminal to actively identify whether there is an intention of providing the indoor positioning service in the current positioning scenario. When an intention that the terminal needs to perform indoor positioning is identified, a specific target building that subsequently needs to provide the indoor positioning service may be further determined for the terminal.

506. The terminal attempts to obtain an indoor positioning result of the terminal in the target building by using the indoor positioning service.

Because the terminal has determined that the user needs to perform indoor positioning in the target building, in step 506, the terminal may enable an indoor positioning module to perform the indoor positioning service, to attempt to obtain the indoor positioning result of the terminal in the target building.

For example, the terminal may determine the indoor positioning result of the terminal in the target building based on a detected Wi-Fi signal or a detected Bluetooth signal. The indoor positioning method is described in detail in a subsequent embodiment. Therefore, details are not described herein.

In addition, specific values of M and N are not limited in this embodiment of this application. A person skilled in the art may set the specific values of M and N based on an actual application scenario or actual experience. For example, in the indoor positioning scenario, the quantity of satellites that can provide an effective positioning service is usually 0 to 5, and therefore a value of M may be set to 4 or 5. In this case, the terminal is triggered to attempt to perform indoor positioning only after the terminal enters an indoor area, thereby reducing power consumption of the terminal. Alternatively, in the positioning scenario in which an indoor area and an outdoor area are intersected, the quantity of satellites that can provide an effective positioning service is usually 6 to 12, and therefore a value of M may be set to 7 or 8. In this case, the terminal is triggered to attempt to perform indoor positioning when the terminal approaches a building, thereby increasing a speed of switching the terminal to the indoor positioning service.

507. If the indoor positioning result is successfully obtained, the terminal stops the outdoor positioning service, and continues to locate the terminal by using the indoor positioning service.

Figure 10:
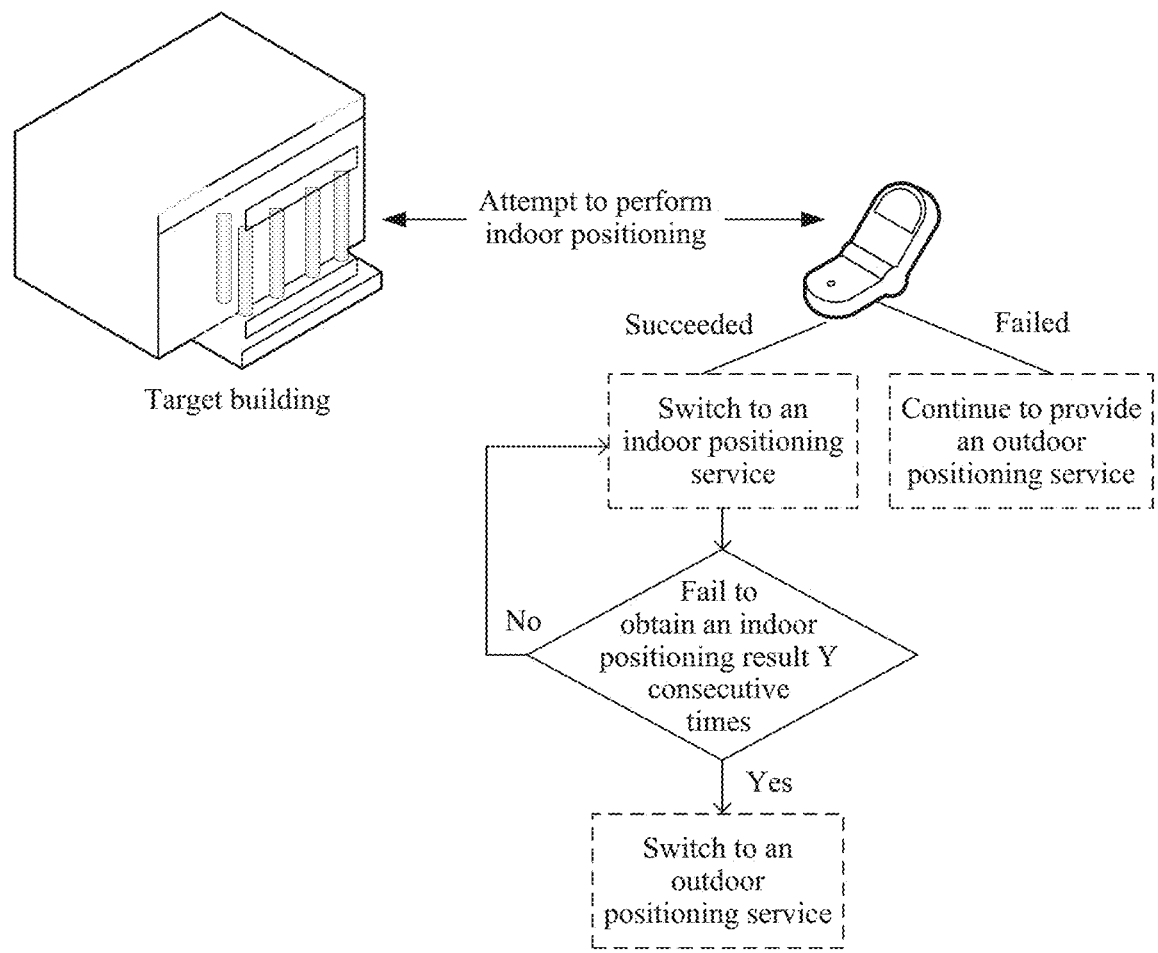
FIG. 10 is a schematic diagram 6 of an application scenario of a positioning method according to an embodiment of this application.

As shown in FIG. 10, after the terminal attempts to obtain the indoor positioning result of the terminal in the target building, if the indoor positioning result can be successfully obtained, it indicates that the terminal is already in an indoor area. In this case, the terminal may continue to locate the terminal by using the indoor positioning service, and the terminal may further stop the outdoor positioning service, thereby reducing power consumption of the terminal.

Optionally, the terminal may further display the currently obtained indoor positioning result on an electronic map. Still as shown in FIG. 4, when the user carries the terminal from the Qianxing gate to a treasure exhibition hall 2, the terminal triggers, based on the quantity X of detected target satellites, the terminal to perform indoor positioning in the treasure exhibition hall 2. The obtained indoor positioning result is an indoor positioning result of the terminal in the treasure exhibition hall 2. For example, the indoor positioning result is P (A, B, C), where A (A≥0) is longitude of the terminal in the treasure exhibition hall 2, B (B≥0) is latitude of the terminal in the treasure exhibition hall 2, and C (C≥0) is a floor of the terminal in the treasure exhibition hall 2. Further, the APP 1 may be triggered to automatically play a voice introduction of the treasure exhibition hall 2, to implement seamless integration between indoor positioning and outdoor positioning.

Further, still as shown in FIG. 10, after the terminal switches from the outdoor positioning service to the indoor positioning service, the indoor positioning result of the terminal in the target building may be periodically obtained by using the indoor positioning service. If the terminal fails to obtain the indoor positioning result of the terminal in the target building Y consecutive times (K≥Y≥1), it indicates that the terminal may not be in the target building currently. Therefore, the terminal may switch from the indoor positioning service to the outdoor positioning service, and cyclically perform step 501 to step 506.

For example, when the terminal fails to obtain the indoor positioning result of the terminal in the target building in three consecutive positioning periods, the terminal may obtain a quantity X' of target satellites that currently provide a positioning service for the terminal, and determine, based on the quantity X' of target satellites, whether to switch to the outdoor positioning service. For example, when M<X'<N, the terminal may stop providing the indoor positioning service and enable the outdoor positioning service to locate the terminal. Otherwise, when performing the indoor positioning service, the terminal may continue to attempt to switch to the outdoor positioning service based on the currently obtained quantity of target satellites until the indoor positioning result is successfully obtained or the indoor positioning service is successfully switched to the outdoor positioning service. That is, when moving from an indoor area to an outdoor area, the terminal may actively detect a current positioning scenario in a positioning process, and then select a positioning method with relatively high precision in the current positioning scenario to locate the terminal, thereby ensuring positioning precision and reducing a time for switching a positioning service from an indoor area to an outdoor area by the terminal.

It may be understood that an upper limit K of a quantity of times that the indoor positioning result is not successfully obtained when the terminal is triggered to switch from the indoor positioning service to the outdoor positioning service may be set by a person skilled in the art based on actual experience or an actual application scenario. This is not limited in this embodiment of the present invention.

Certainly, after switching the outdoor positioning service to the indoor positioning service, the terminal may continue to periodically obtain, by using the satellite positioning chip, the quantity X of target satellites that currently provide a positioning service for the terminal. If it is detected that M<X<N, that is, the quantity of target satellites that currently provide a positioning service is not particularly small or large, the terminal is usually in an outdoor area currently. In this case, the terminal attempts to switch to the outdoor positioning service until the outdoor positioning service is successfully obtained.

508. If the indoor positioning result is not obtained, the terminal cyclically performs step 502 to step 506.

Correspondingly, if the terminal fails to attempt to obtain the indoor positioning result of the terminal in the target building, it indicates that the user may only pass through the target building or have not entered the target building currently. Therefore, the terminal may continue to provide the outdoor positioning service, and cyclically perform 501 to step 506.

Although the terminal does not obtain the indoor positioning result this time, each time when performing outdoor positioning, the terminal may actively detect, based on the quantity of target satellites, whether the indoor positioning result can be obtained currently, and once the indoor positioning result is obtained, the terminal may quickly switch to the indoor positioning service, thereby ensuring positioning precision, reducing a time consumed by switching a positioning service between an indoor area and an outdoor area, and improving user's use experience.

In addition, the positioning method provided in this embodiment of the present invention can accurately and quickly complete switching between indoor positioning and outdoor positioning. Therefore, a more prepared navigation service may be provided for the user based on the positioning method. For example, a destination entered by the user in a navigation APP may be a specific indoor location, for example, a McDonald's restaurant in a  shopping mall. In this case, the navigation APP may plan a detailed route from a place of departure to the destination for the user. The route includes not only an outdoor navigation route from the place of departure to the  shopping mall, but also an indoor navigation route from the  shopping mall to the McDonald's restaurant in the shopping mall. For example, the indoor navigation route includes a walking route from an entrance of the  shopping mall to an elevator, a floor reminder of taking the elevator, and a route to the McDonald's restaurant after the user leaves the elevator, to provide a more accurate navigation service for the user.

Further, in this embodiment of the present invention, after planning the specific navigation route for the user, the terminal may further determine, based on the navigation route, a trigger location for triggering switching of a positioning scenario. For example, the navigation route includes an outdoor navigation route from home to a doorway of the  shopping mall, and an indoor navigation route from the doorway of the  shopping mall to the McDonald's restaurant in the shopping mall. In this case, an end point of the outdoor navigation route (namely, a start point of the indoor navigation route); the doorway of the ** shopping mall may be used as a trigger location for switching from the outdoor positioning service to the indoor positioning service. In this way, when the terminal detects that a real-time location of the user is the trigger location, the terminal may be triggered to switch from the outdoor positioning service to the indoor positioning service, and seamless switching between the indoor positioning service and the outdoor positioning service can also be quickly and accurately implemented.

In this case, by performing step 501 to step 508, the terminal may identify, based on a quantity of target satellites detected in real time, a requirement of the terminal for performing the indoor positioning service, and when the terminal has an indoor positioning service requirement, the terminal is triggered to determine, based on the outdoor positioning result, a specific target building for performing indoor positioning, and attempt to perform indoor positioning on the terminal in the target building, thereby quickly and accurately implementing seamless switching between the indoor positioning service and the outdoor positioning service, and improving user's use experience.

In addition, in this embodiment of this application, regardless whether the terminal provides the indoor positioning service or the outdoor positioning service, the terminal may further adjust a positioning period during positioning based on a distance between a terminal location and a target location.

For example, when the distance between the terminal location and the target location is relatively long, positioning precision required by the terminal is not very high. Therefore, the positioning period of the terminal may be set to be relatively long, thereby reducing power consumption of the terminal. When the distance between the terminal location and the target location is relatively short, the positioning precision required by the terminal increases. Therefore, the positioning period of the terminal may be set to be relatively short, thereby ensuring that the user can obtain a relatively accurate positioning result in real time.

Figure 11:
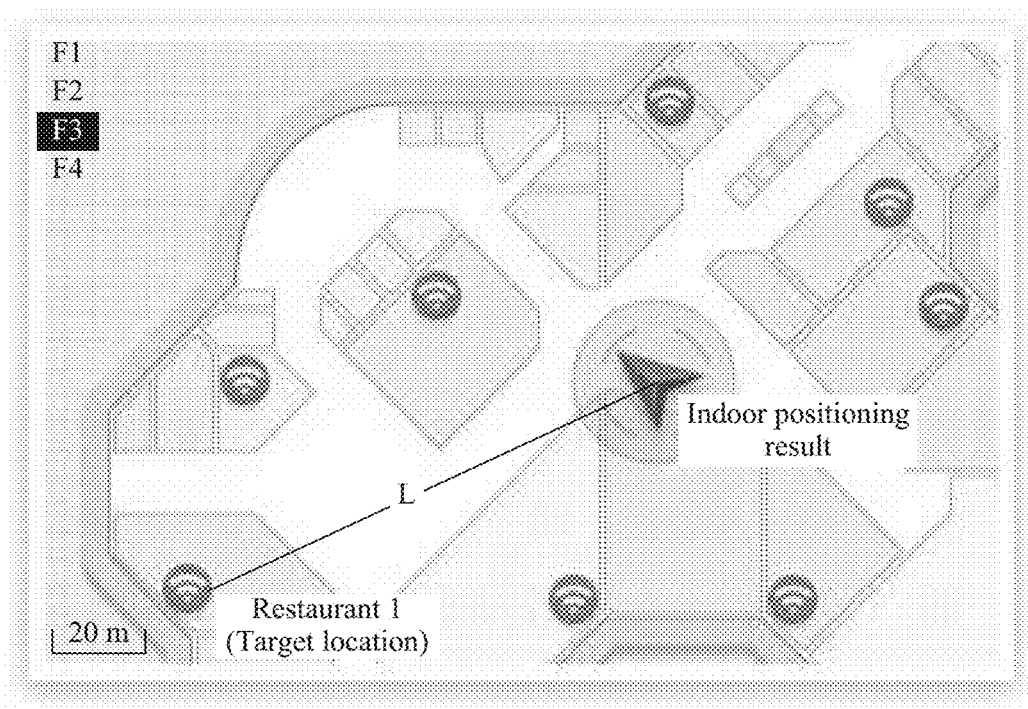
FIG. 11 is a schematic diagram 7 of an application scenario of a positioning method according to an embodiment of this application.

In an indoor positioning scenario, as shown in FIG. 11, when the user is on a third floor of a shopping mall A, the terminal provides a real-time indoor positioning result for the user by using the indoor positioning service. If the user enters a current target location to the terminal as a restaurant 1, the terminal may obtain a distance L (L>0) between the indoor positioning result and the restaurant 1 based on a default positioning period. When the distance L is greater than 200 meters, an indoor positioning period of the terminal may be adjusted to 15 seconds. When the distance L is greater than 50 meters and is less than 200 meters, the indoor positioning period of the terminal may be adjusted to 10 seconds. When the distance L is less than 50 meters, the indoor positioning period of the terminal may be adjusted to 5 seconds.

Figure 12A:
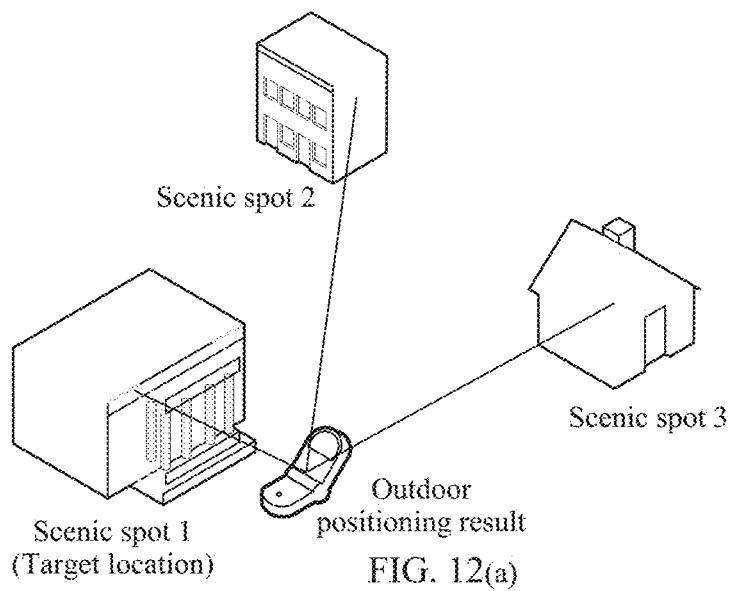
FIG. 12(a) and FIG. 12(b) are a schematic diagram 8 of an application scenario of a positioning method according to an embodiment of this application.
Figure 12B:
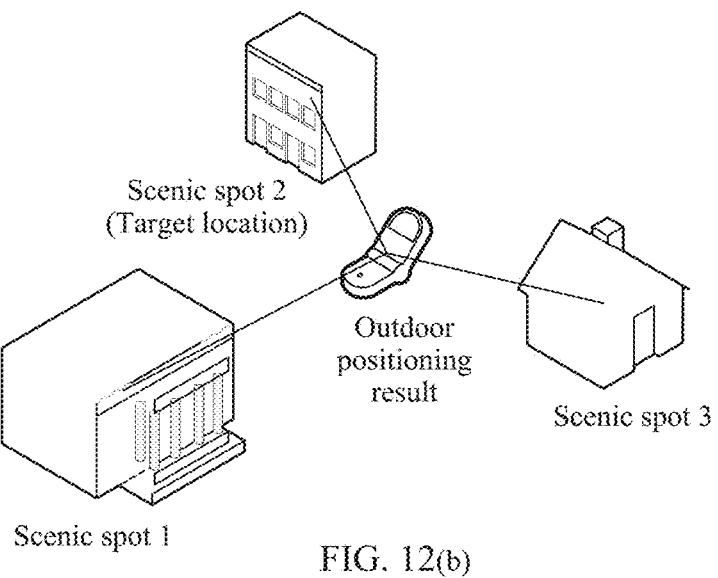

In an outdoor positioning scenario, as shown in FIG. 12(a), the terminal may separately obtain a distance between an outdoor positioning result and a scenic spot 1, a distance between the outdoor positioning result and a scenic spot 2, and a distance between the outdoor positioning result and a scenic spot 3 based on a default positioning period. Further, the terminal uses a scenic spot (for example, the scenic spot 1) closest to the terminal as a target location of a current positioning service, and adjusts the outdoor positioning period in real time based on the distance between the terminal and the scenic spot 1. In a moving process of the terminal, the terminal continues to separately obtain a distance between an outdoor positioning result and the scenic spot 1, a distance between the outdoor positioning result and the scenic spot 2, and a distance between the outdoor positioning result and the scenic spot 3 based on an adjusted positioning period. As shown in FIG. 12(b), the terminal still uses a scenic spot (for example, the scenic spot 2) closest to the terminal as a target location of a current positioning service, and adjusts the outdoor positioning period in real time based on the distance between the terminal and the scenic spot 2.

Certainly, an upper limit and a lower limit may be set in advance for the foregoing positioning period (the outdoor positioning period or the indoor positioning period). For example, after the positioning period is reduced to 3 seconds, even if the distance between the terminal location and the target location continues to be shorter, the positioning period of the terminal is still 3 seconds; and when the positioning period is increased to 30 seconds, even if the distance between the terminal location and the target location continues to be longer, the positioning period of the terminal is still 30 seconds.

It should be noted that a person skilled in the art may set a specific adjustment algorithm of the foregoing positioning period based on an actual application scenario or actual experience. For example, the positioning period may be set to L/10, where L is the distance between the terminal location and the target location. This is not limited in this embodiment of this application.

In some embodiments of this application, the terminal may provide the indoor positioning service for the terminal in the target building based on a Wi-Fi service. Each Wi-Fi access point has a globally unique MAC address, and the terminal may scan and collect a broadcast signal (namely, a Wi-Fi signal) of a surrounding Wi-Fi access point when a Wi-Fi service is enabled. Therefore, the terminal may obtain a MAC address broadcast by the Wi-Fi access point. In this case, the terminal sends data (for example, the MAC address) that can identify the Wi-Fi access point to a location server by using a wireless communications network. The location server retrieves a geographical location of each Wi-Fi access point, calculates the indoor positioning result of the terminal in the target building based on strength of the Wi-Fi broadcast signal, and sends the indoor positioning result to a positioning module of the terminal.

For example, the terminal may pre-download a Wi-Fi fingerprint database of each building that provides the indoor positioning service from a network side. The target building is used as an example. A Wi-Fi fingerprint database of the target building is used to reflect distribution of a Wi-Fi signal at each location in the target building. Each location in the target building corresponds to one location fingerprint. Each location fingerprint includes a group of Wi-Fi signal parameters that reflect a Wi-Fi signal at the location, for example, an RSSI (Received Signal Strength Indication, received signal strength indicator) of the Wi-Fi signal, an SSID (Service Set Identifier, service set identifier) of the Wi-Fi signal, and a unique identifier of an AP (Access Point, access point) to which the Wi-Fi signal belongs, for example, a MAC (Media Access Control, media access control) address.

Figure 13:
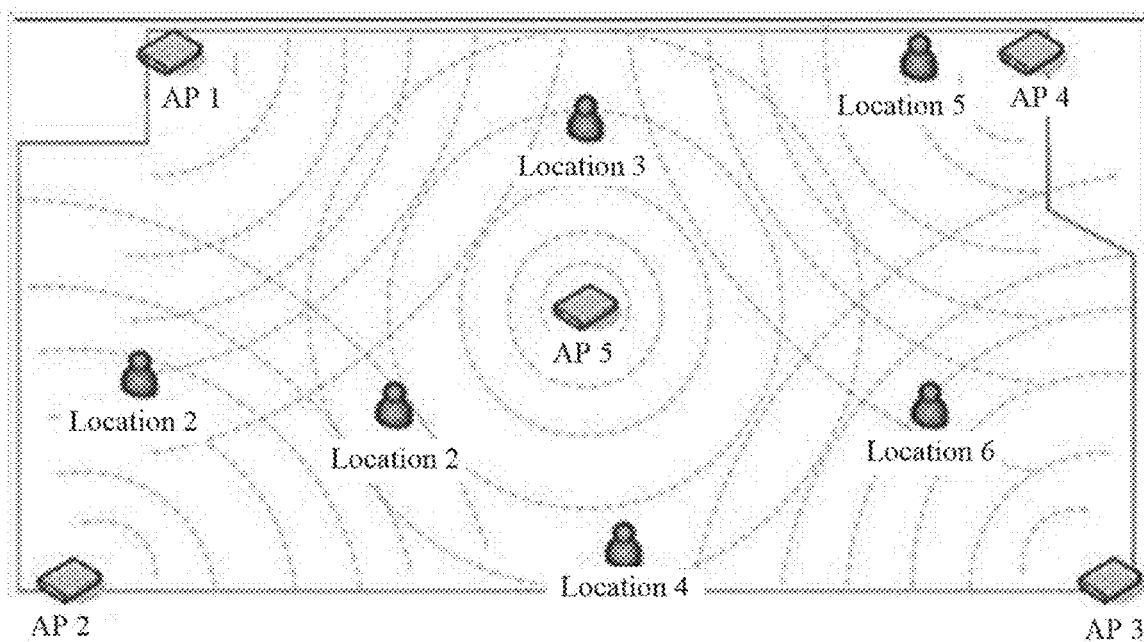
FIG. 13 is a schematic diagram 9 of an application scenario of a positioning method according to an embodiment of this application.

As shown in FIG. 13, a plurality of Wi-Fi access points (an AP 1 to an AP 5) are disposed inside the target building, and a location fingerprint is formed after Wi-Fi signals sent by these Wi-Fi access points are superposed at various locations in space. For example, each of a location 1 to a location 6 in FIG. 13 corresponds to one location fingerprint (that is, corresponds to a group of Wi-Fi signal parameters), and these locations and the location fingerprint of each location form a Wi-Fi fingerprint database of the target building. Each location may be a location represented by two-dimensional coordinates, or may be three-dimensional coordinates including a floor identifier. This is not limited in this embodiment of this application.

Specifically, the location server may prestore the Wi-Fi fingerprint database of the target building. When the terminal attempts to obtain the indoor positioning result of the terminal in the target building in step 205, the terminal may send a signal feature parameter in a currently detected target Wi-Fi signal, for example, an RSSI and an SSID of the target Wi-Fi signal, to the location server. Further, the location server compares the signal feature parameter with a location fingerprint of each location in the Wi-Fi fingerprint database of the target building, and finally feeds back a location corresponding to a location fingerprint with a relatively small difference to the terminal as a current indoor positioning result of the terminal.

For example, when the location fingerprint of each location in the Wi-Fi fingerprint database of the target building is compared, a pre-collected location fingerprint in the Wi-Fi fingerprint database may not be totally consistent with a signal feature parameter in a target Wi-Fi signal collected in actual positioning. For example, some actually collected signal feature parameters may not be recorded in the Wi-Fi fingerprint database, or some signal feature parameters recorded in the Wi-Fi fingerprint database are not actually collected.

In this case, when fingerprint matching is performed, a minimum value $R_{low}$ of an RSSI in the entire Wi-Fi fingerprint database may be first obtained. Further, a quantity M of types of feature parameters in a union set of two to-be-matched signal feature parameters (one is any location fingerprint in the Wi-Fi fingerprint database, and the other is a signal feature parameter in a target Wi-Fi signal actually collected by the terminal) and a quantity N of common feature parameters in the two signal feature parameters may be determined. When N is greater than a preset value, the location server may be triggered to perform fingerprint matching (namely, perform indoor positioning). Otherwise, it is considered that a difference between the two signal feature parameters is very large.

Specifically, during fingerprint matching, the following formula (1) may be used to calculate the difference dif between the two signal feature parameters:

$$\text{Difference } dif = \frac{\sum_{i=1}^{M} p_i |r_i - r'_i|}{M}, \quad (1)$$

$p_i$ is a weight coefficient, and may be 1 by default; for the N common feature parameters in the two signal feature parameters, each of $r_i$ and $r_i'$ is an RSSI corresponding to the common feature parameter; and for a feature parameter other than the N common feature parameters (that is, M-N feature parameters), one of $r_i$ and $r_i'$ is an RSSI corresponding to a common feature parameter in one of the signal feature parameters, and the other one of $r_i$ and $r_i'$ is $R_{low}$.

Certainly, the terminal may alternatively download the Wi-Fi fingerprint database of the target building locally in advance. In this way, after detecting the target Wi-Fi signal, the terminal may extract the signal feature parameter from the target Wi-Fi signal, and then compare the signal feature parameter with the location fingerprint of each location in the Wi-Fi fingerprint database of the target building, to obtain the indoor positioning result of the terminal in the target building.

Optionally, the Wi-Fi fingerprint database downloaded by the terminal locally may be an area to which the terminal currently belongs, for example, a Wi-Fi fingerprint database of each candidate building in the area 2. In this way, when the terminal moves to a new area, the terminal may be triggered to automatically download a Wi-Fi fingerprint database of each candidate building in the new area. Certainly, the user may manually select a Wi-Fi fingerprint database of a corresponding building to download the Wi-Fi fingerprint database locally. This is not limited in this embodiment of this application.

In addition, in this embodiment of this application, after the terminal enables the indoor positioning service to obtain a currently detected Wi-Fi signal, because a plurality of Wi-Fi signals are usually detected, the terminal may further perform screening on the plurality of Wi-Fi signals, and use a radio signal that meets a preset indoor positioning condition as a target radio signal. For example, a Wi-Fi signal generated when a mobile phone or a laptop is used as a hotspot is removed, or a Wi-Fi signal that does not belong to a preset Wi-Fi whitelist is removed, thereby avoiding interference from an extra Wi-Fi signal to matching performed on a location fingerprint in the Wi-Fi fingerprint database of the target building.

Further, in this embodiment of this application, the location server may further determine, based on signal feature parameters in target Wi-Fi signals reported by each terminal at different time points at a same location, a difference between distribution of an actual Wi-Fi signal at the location and a location fingerprint recorded in a Wi-Fi fingerprint database. For example, the difference may be a signal strength difference of a newly added Wi-Fi signal, a reduced Wi-Fi signal, or an original Wi-Fi signal. If these differences are consistent or tend to be consistent, the location server may update the location fingerprint in the Wi-Fi fingerprint database based on the differences.

Figure 14:
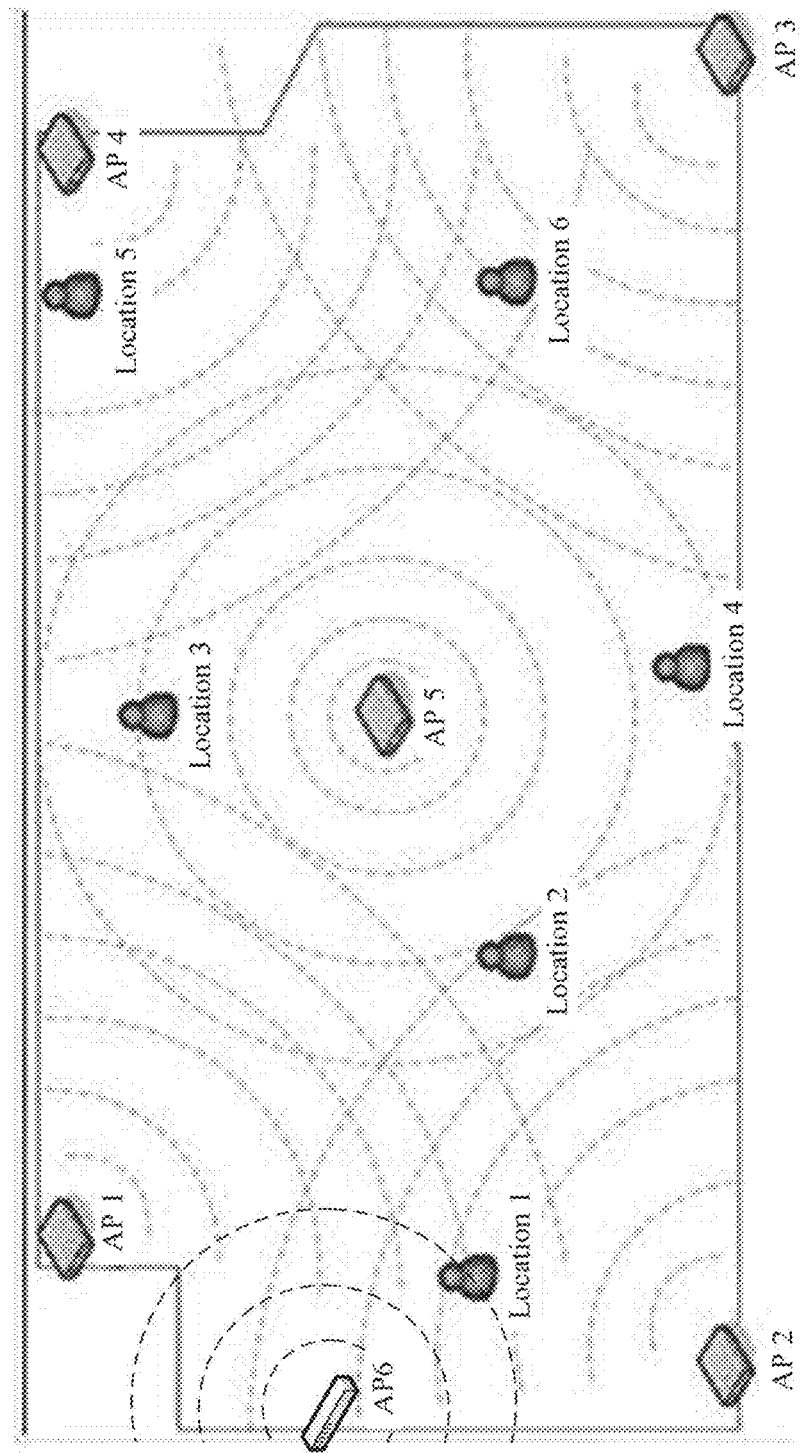
FIG. 14 is a schematic diagram 10 of an application scenario of a positioning method according to an embodiment of this application.

For example, as shown in FIG. 14, compared with the location fingerprint in the Wi-Fi fingerprint database shown in FIG. 13, an AP 6 is newly added to the target building. In this case, if K terminals (for example, 20 terminals) at the location 1 report Wi-Fi signals generated by a newly added AP 5 in signal feature parameters in a continuous period of time (for example, one week), it indicates that an actual location fingerprint at the location 1 changes. In this case, the location server may update the location fingerprint at the location 1 in the Wi-Fi fingerprint database, to improve accuracy of each location fingerprint in the Wi-Fi fingerprint database, thereby improving positioning precision in subsequent indoor positioning.

Certainly, if the terminal locally stores the Wi-Fi fingerprint database, the terminal may implement a self-learning update process of the location fingerprint based on the signal feature parameters of the target Wi-Fi signals collected by the terminal at the different time points at the same location. This is not limited in this embodiment of this application.

Figure 15:
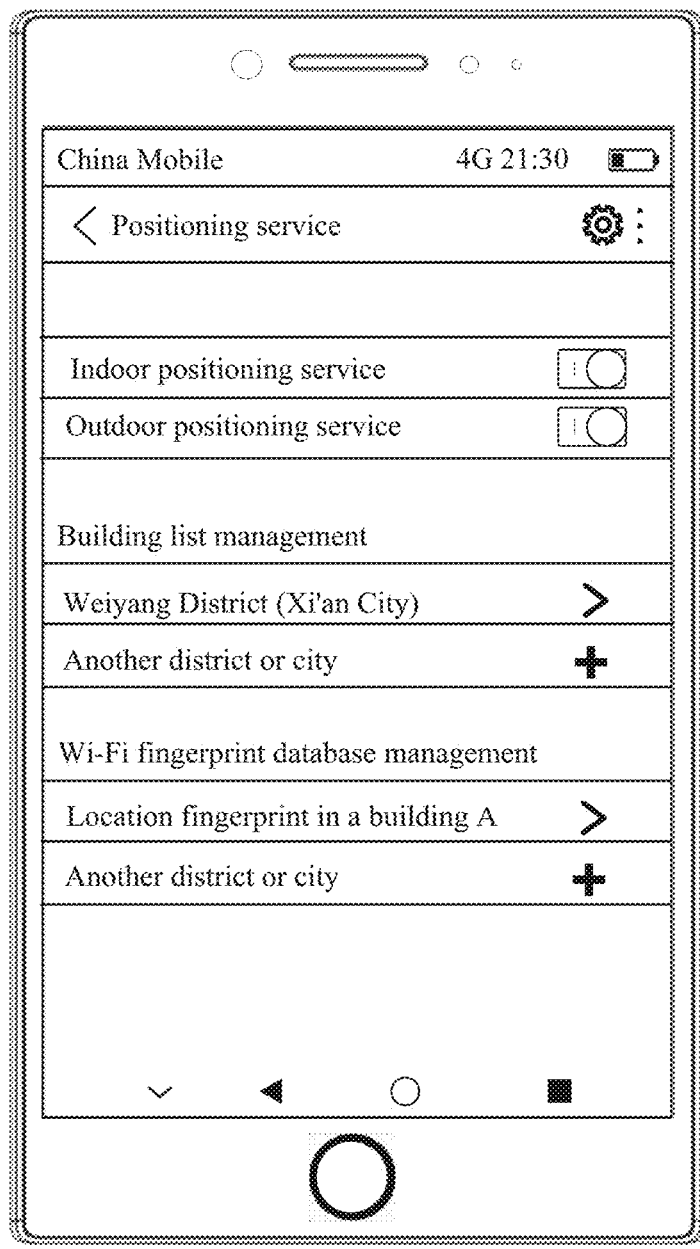
FIG. 15 is a schematic diagram 11 of an application scenario of a positioning method according to an embodiment of this application.

In addition, as shown in FIG. 15, the user may further enter a setting interface of a positioning service, and manually enable or disable the indoor positioning service or the outdoor positioning service. Optionally, the user may further manually manage a list of buildings that provide the indoor positioning service. For example, the user may manually delete or add information such as GPS coordinates of a candidate building in a downloaded area (for example, a Weiyang district in FIG. 15), or manually add a list of buildings that provide the indoor positioning service in another district or city. Similarly, the user may further manually manage a Wi-Fi fingerprint database used in the indoor positioning service. For example, the user may manually delete, add, or modify a location fingerprint of any location in a downloaded Wi-Fi fingerprint database of a building, or manually add a Wi-Fi fingerprint database in a building that provides the indoor positioning service in another district or city. This is not limited in this embodiment of this application.

It may be understood that to implement the foregoing functions, the terminal and the like include a corresponding hardware structure and/or software module for performing each function. A person skilled in the art should be easily aware that, the example units, algorithms, and steps described with reference to the embodiments disclosed in this specification can be implemented in the embodiments of this application by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the range of the embodiments of this application.

In the embodiments of this application, the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely logical function division. In actual implementation, another division manner may be used.

Figure 16:
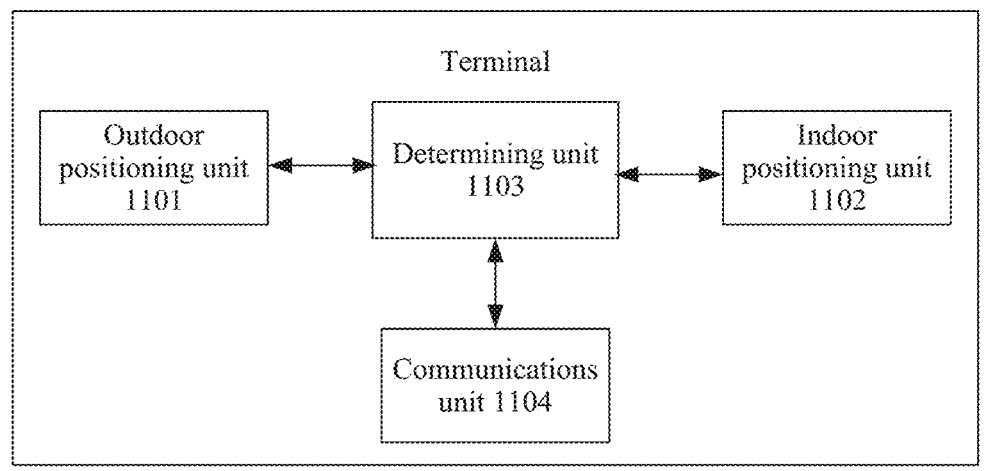
FIG. 16 is a schematic structural diagram 2 of a terminal according to an embodiment of this application.

When each function module is obtained through division based on each corresponding function, FIG. 16 is a possible schematic structural diagram of the terminal in the foregoing embodiment. The terminal includes an outdoor positioning unit 1101, an indoor positioning unit 1102, a determining unit 1103, and a communications unit 1104.

The outdoor positioning unit 1101 is configured to support the terminal in performing the process 501 in FIG. 5. The indoor positioning unit 1102 is configured to support the terminal in performing the process 506 and the process 507 in FIG. 5. The determining unit 1103 is configured to support the terminal in performing the process 504 and the process 505 in FIG. 5. The communications unit 1104 is configured to support the terminal in performing the process 502 in FIG. 5. All related content of the steps in the foregoing method embodiment may be cited in function descriptions of corresponding function modules. Details are not described herein again.

For example, the determining unit 1103 is configured to control and manage an action of the terminal. Specifically, the determining unit 1103 may be a processor or a controller, for example, may be a central processing unit (Central Processing Unit, CPU), a GPU, a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The determining unit 1103 may implement or execute various example logical blocks, modules, and circuits described with reference to content disclosed in this application. The processor may be alternatively a combination of processors implementing a computing function, for example, a combination of one or more microprocessors or a combination of a DSP and a microprocessor.

The communications unit 1104 may be configured to support communication between the terminal and another network entity. Specifically, the communications unit 1104 may be a transceiver, a transceiver circuit, an input/output device, a communications interface, or the like. For example, a communications module 1303 may be specifically a Bluetooth module, a Wi-Fi module, or a peripheral interface.

The outdoor positioning unit 1101 may be configured to provide an outdoor positioning service for the terminal in an outdoor positioning scenario. For example, the outdoor positioning unit 1101 may be a GPS chip, an AGPS chip, or another processing circuit/chip.

The indoor positioning unit 1102 may be configured to provide an indoor positioning service for the terminal in an indoor positioning scenario. For example, the indoor positioning unit 1102 may be a Wi-Fi chip, a Bluetooth chip, or another processing circuit/chip.

Certainly, the terminal may further include components such as a memory and a display screen. This is not limited in this embodiment of the present invention. When the determining unit 1103 is a processor, the communications unit 1104 is a radio frequency circuit, the outdoor positioning unit 1101 is a GPS positioning module, and the indoor positioning unit 1102 is a Wi-Fi module, the terminal provided in this embodiment of this application may be the mobile phone 100 shown in FIG. 1.

All or some of the foregoing embodiments may be implemented by using software, hardware, firmware, or any combination thereof. When a software program is used to implement the embodiments, the embodiments may be implemented all or partially in a form of a computer program product. The computer program product includes one or more computer instructions. When the computer program instructions are loaded and executed on a computer, the procedures or the functions in the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific implementations of this application, but the protection scope of this application is not limited thereof. Any variation or replacement within the technical scope disclosed in this application shall fall within the protection scope of this application. Therefore, the protection scope of this application shall be subject to the protection scope of the claims.

What is claimed is:

1. A positioning method implemented by a terminal, comprising:

obtaining an outdoor positioning result from an outdoor positioning service;

attempting to obtain an indoor positioning result from an indoor positioning service when satellite information about a satellite that provides the outdoor positioning service meets a preset condition, wherein the preset condition indicates that the terminal has an indoor positioning requirement, wherein satellite information comprises a quantity of satellites that provide a positioning service, wherein a target satellite among the satellites that provide the positioning service for the terminal sends a satellite signal with a signal-to-noise ratio greater than a preset value;

switching from the outdoor positioning service to the indoor positioning service when the indoor positioning result is successfully obtained;

attempting to again obtain the indoor positioning result; and after switching from the outdoor positioning service to the indoor positioning service, switching from the indoor positioning service to the outdoor positioning service in response to two consecutive failed attempts to obtain the indoor positioning result.

2. The positioning method of claim 1, further comprising:

determining a distance between the terminal and a candidate building in a target area, wherein the target area is a preset area to which the outdoor positioning result belongs;

setting the candidate building as a target building when the distance is less than a preset value; and enabling the indoor positioning service for obtaining the indoor positioning result in the target building.

3. The positioning method of claim 1, further comprising:

successfully obtaining the indoor positioning result; and stopping providing the outdoor positioning service.

4. The positioning method of claim 1, wherein after attempting to obtain the indoor positioning result, the positioning method further comprises:

identifying that the indoor positioning result is not obtained; and continuing to obtain the outdoor positioning result using the outdoor positioning service.

5. The positioning method of claim 1, further comprising:

determining a distance between the terminal and a target location, wherein the target location is a destination to which the terminal moves during a current positioning period; and adjusting a length of the current positioning period based on the distance.

6. The positioning method of claim 5, wherein a value of the current positioning period increases when the distance increases.

7. The positioning method of claim 5, wherein before determining the distance between the terminal and a target location, the method further comprises using, from among preset candidate locations, a preset candidate location closest to the terminal as the target location.

8. The positioning method of claim 1, further comprising:

receiving a target radio signal, wherein the target radio signal meets a preset indoor positioning condition;

extracting a signal feature parameter from the target radio signal; and sending the signal feature parameter to a location server to enable the location server to determine the indoor positioning result based on the signal feature parameter.

9. The positioning method of claim 8, wherein after extracting the signal feature parameter, the positioning method further comprises:

determining differences among signal feature parameters in target radio signals obtained at a location in a preset time period and a preset location fingerprint at the location, wherein the preset location fingerprint indicates distribution of a WI-FI signal recorded at the location in a preset WI-FI fingerprint database; and updating the preset location fingerprint at the location based on the differences.

10. The positioning method of claim 1, further comprising:

determining a navigation route;

determining, based on the navigation route, a trigger location for attempting to obtain an outdoor positioning result from an outdoor positioning service; and determining, based on the navigation route, a trigger location for attempting to obtain an indoor positioning result from an indoor positioning service.

11. A terminal, comprising:

a receiver configured to obtain an outdoor positioning result from an outdoor positioning service; and a processor coupled to the receiver, and configured to determine whether satellite information about a satellite that provides the outdoor positioning service meets a preset condition, wherein the preset condition indicates that the terminal has an indoor positioning requirement, wherein satellite information comprises a quantity of target satellites that provide a positioning service, wherein a target satellite among the satellites that provide a positioning service sends a satellite signal with a signal-to-noise ratio greater than a preset value, and wherein the processor is further configured to attempt to obtain an indoor positioning result using an indoor positioning service when the information about the satellite that provides the outdoor positioning service meets the preset condition;

switch from the outdoor positioning service to the indoor positioning service when the indoor positioning result is successfully obtained;

identify that the terminal fails to obtain the indoor positioning result for one or more attempts; and after switching from the outdoor positioning service to the indoor positioning service, switch from the indoor positioning service to the outdoor positioning service in response to two consecutive failed attempts to obtain the indoor positioning result.

12. The terminal of claim 11, wherein the processor is further configured to:

determine a distance between the terminal and a candidate building in a target area, wherein the target area is a preset area to which the outdoor positioning result belongs;

set the candidate building as a target building when the distance is less than a preset value; and enable the indoor positioning service to attempt to obtain the indoor positioning result in the target building.

13. The terminal of claim 11, wherein the processor is further configured to stop providing the outdoor positioning service.

14. The terminal of claim 11, wherein the processor is further configured to:
  identify that the indoor positioning result is not obtained; and
  continue to obtain the outdoor positioning result using the outdoor positioning service.

15. The terminal of claim 11, wherein the processor is further configured to:
  determine a distance between the terminal and a target location, wherein the target location is a destination to which the terminal moves during a current positioning period; and
  adjust a length of the current positioning period based on the distance.

16. The terminal of claim 15, wherein a value of the current positioning period increases when the distance increases.

17. The terminal of claim 15, wherein the processor is further configured to use, from among preset candidate locations, a preset candidate location closest to the terminal as the target location.

18. The terminal of claim 11, wherein the terminal is further configured to:
  receive a target radio signal, wherein the target radio signal meets a preset indoor positioning condition;
  extract a signal feature parameter from the target radio signal; and
  send the signal feature parameter to a location server to enable the location server to determine the indoor positioning result based on the signal feature parameter.

19. The terminal of claim 18, wherein the processor is further configured to:
  determine differences among signal feature parameters in target radio signals obtained at a location in a preset time period and a preset location fingerprint at the location, wherein the preset location fingerprint indicates distribution of a WI-FI signal recorded at the location in a preset WI-FI fingerprint database; and
  update the preset location fingerprint at the location based on the differences.

20. The terminal of claim 11, wherein the processor is further configured to:
  determine a navigation route;
  determine, based on the navigation route, a trigger location for attempting to obtain an outdoor positioning result from an outdoor positioning service; and
  determine, based on the navigation route, a trigger location for attempting to obtain an indoor positioning result from an indoor positioning service.

* * * * *